United States Patent
Mizusako

(10) Patent No.: US 12,437,681 B2
(45) Date of Patent: Oct. 7, 2025

(54) PROJECTION DISPLAY DEVICE

(71) Applicant: SEIKO EPSON CORPORATION, Tokyo (JP)

(72) Inventor: Kazuhisa Mizusako, Shiojiri (JP)

(73) Assignee: SEIKO EPSON CORPORATION, Tokyo (JP)

( * ) Notice: Subject to any disclaimer, the term of this patent is extended or adjusted under 35 U.S.C. 154(b) by 0 days.

(21) Appl. No.: 18/931,893

(22) Filed: Oct. 30, 2024

(65) Prior Publication Data

US 2025/0140139 A1    May 1, 2025

(30) Foreign Application Priority Data

Oct. 31, 2023  (JP) ................. 2023-186665

(51) Int. Cl.
*G09G 3/00* (2006.01)
*G09G 3/36* (2006.01)

(52) U.S. Cl.
CPC .......... *G09G 3/001* (2013.01); *G09G 3/3614* (2013.01); *G09G 2320/0233* (2013.01)

(58) Field of Classification Search
CPC .......... G09G 2320/0233; G09G 3/001; G09G 3/3614; G09G 3/002
See application file for complete search history.

(56) References Cited

U.S. PATENT DOCUMENTS

| | | | | |
|---|---|---|---|---|
| 5,337,171 | A | * | 8/1994 | Mase ............... G02F 1/1347 348/E9.027 |
| 2010/0128228 | A1 | * | 5/2010 | Matsuo .............. G03B 37/04 353/30 |
| 2010/0201952 | A1 | | 8/2010 | Sakai |
| 2012/0287098 | A1 | * | 11/2012 | Ito ..................... G09G 3/001 345/208 |
| 2019/0116343 | A1 | * | 4/2019 | Nakamura ........ H04N 9/3164 |
| 2021/0076015 | A1 | * | 3/2021 | Hosaka .............. G09G 3/002 |
| 2021/0280107 | A1 | * | 9/2021 | Hosaka .............. H04N 9/317 |
| 2022/0163829 | A1 | * | 5/2022 | Wakabayashi ...... G02B 26/08 |

FOREIGN PATENT DOCUMENTS

| | | |
|---|---|---|
| JP | 2002-244203 A | 8/2002 |
| JP | 2010-181670 A | 8/2010 |
| WO | WO-2020057296 A1 * 3/2020 ............. G03B 21/20 |

* cited by examiner

*Primary Examiner* — Ricardo Osorio
(74) *Attorney, Agent, or Firm* — Oliff PLC

(57) ABSTRACT

A projection display device including a first liquid crystal panel that generates a first image, a second liquid crystal panel that generates a second image, a prism that combines the first image with the second image shifted in a horizontal direction with respect to the first pixel and outputs a combination image, a light path shift element, and a display control circuit that controls the first liquid crystal panel, the second liquid crystal panel and the light path shift element. The display control circuit supplies a data signal of a first color component in an odd-numbered row of video pixel data to the first liquid crystal panel in a first unit period, and supplies the same data signal of the same first color component in an even-numbered row of the video pixel data to the first liquid crystal panel in a second unit period.

7 Claims, 14 Drawing Sheets

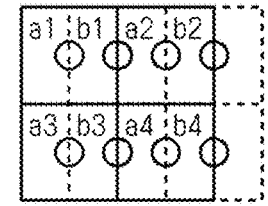
FIG. 3
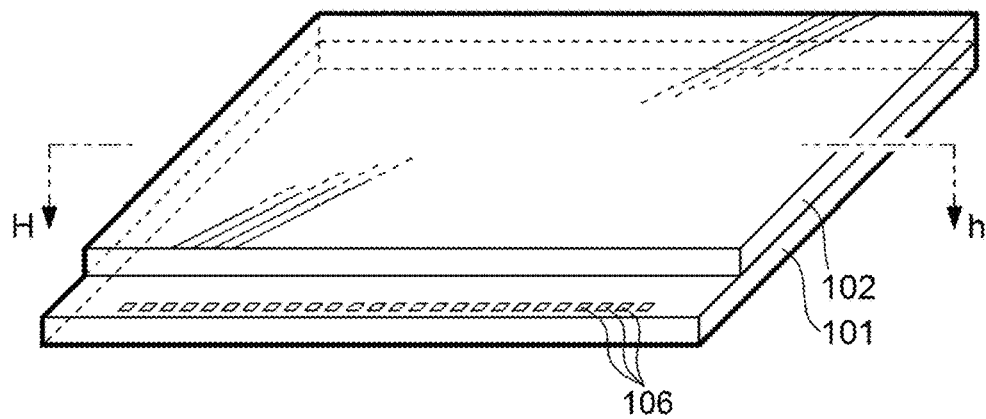
FIG. 4
FIG. 5

PROJECTION DISPLAY DEVICE

The present application is based on, and claims priority from JP Application Serial Number 2023-186665, filed Oct. 31, 2023, the disclosure of which is hereby incorporated by reference herein in its entirety.

BACKGROUND

1. Technical Field

The present disclosure relates to a projection display device.

2. Related Art

In a projection display device that projects image light created by a liquid crystal panel or the like onto a screen or the like, a technology for shifting a first optical image generated by a first optical system and a second optical image generated by a second optical system, combining the optical images, and projecting a resultant image to achieve high resolution has been proposed (see, for example, JP-A-2010-181670).

Specifically, when color display is realized in the technology, the following configuration is used. That is, images from three liquid crystal panels are combined by a first dichroic prism so that a first optical image is obtained in the first optical system, images from three liquid crystal panels are combined by a second dichroic prism so that a second optical image is obtained in the second optical system, and the first optical image and the second optical image are combined by a prism.

However, in the technology, not only a total of six liquid crystal panels, but also three prisms for combining the optical images are required. To this end, the technology has a problem in that not only a configuration becomes more complex, but costs also increase to realize a high-resolution color display.

SUMMARY

In order to solve the problems, a projection display device according to one aspect of the present disclosure includes a first image light emission device configured to emit a first color light component and a second color light component in first image light in a time-division manner, a second image light emission device configured to emit a first color light component and a second color light component in second image light in a time-division manner, an optical combination system configured to combine the first image light with the second image light in a state in which the second image light is shifted in a first direction relative to the first image light, and emit a combination light, a light path shift element configured to shift a light path for the combination light emitted from the optical combination system, and a display control circuit configured to control the first image light emission device, the second image light emission device, and the light path shift element, wherein a one-frame period includes first to fourth unit periods, the display control circuit supplies the video pixel aligned in the first direction at odd-numbered positions in a second direction intersecting with the first direction in video pixel data among data signals corresponding to gradation levels designated by the video pixel data arranged in a matrix, the video pixel being a data signal of the first light component, to the first image light emission device, supplies the video pixel aligned in the first direction at an even-numbered position in the second direction in the video pixel data, the video pixel being a data signal of one of the first light component and the second light component, to the second image light emission device, and controls the light path shift element so that the light path is set as a reference position in the first unit period, supplies the video pixel aligned in the first direction at an even-numbered position in the second direction in the video pixel data, the video pixel being a data signal of the first light component, to the first image light emission device, supplies the video pixel aligned in the first direction at an odd-numbered position in the second direction in the video pixel data, the video pixel being a data signal of one of the first light component and the second light component, to the second image light emission device, and controls the light path shift element so that the light path is shifted in the second direction in the second unit period, supplies the video pixel aligned in the first direction at an odd-numbered position in the second direction in the video pixel data, the video pixel being a data signal of the second light component, to the first image light emission device, supplies the video pixel aligned in the first direction at an even-numbered position in the second direction in the video pixel data, the video pixel being a data signal of the other of the first light component and the second light component, to the second image light emission device, and controls the light path shift element so that the light path returns to the reference position in the third unit period, and supplies the video pixel aligned in the first direction at an even-numbered position in the second direction in the video pixel data, the video pixel being a data signal of the second light component, to the first image light emission device, supplies the video pixel aligned in the first direction at an odd-numbered position in the second direction in the video pixel data, the video pixel being a data signal of the other of the first light component and the second light component, to the second image light emission device, and controls the light path shift element so that the light path is shifted in the second direction in the fourth unit period, and the first image light emission device emits the first image light based on the supplied data signal, and the second image light emission device emits the second image light based on the supplied data signal.

BRIEF DESCRIPTION OF THE DRAWINGS

FIG. 3 is a diagram illustrating an arrangement of video pixels in the projection display device.

FIG. 4 is a diagram illustrating disposition of panel pixels in the projection display device.

FIG. 5 is a perspective view illustrating a configuration of a liquid crystal panel in the projection display device.

DESCRIPTION OF EMBODIMENTS

Hereinafter, a projection display device according to an embodiment will be described with reference to the drawings. In each drawing, dimensions and scales of each portion are appropriately different from actual ones. Further, since embodiments to be described below are preferred specific examples, various technically preferable limitations are applied, but the scope of the present disclosure is not limited to these embodiments unless it is otherwise stated in the following description that the present disclosure is limited.

Figure 1:
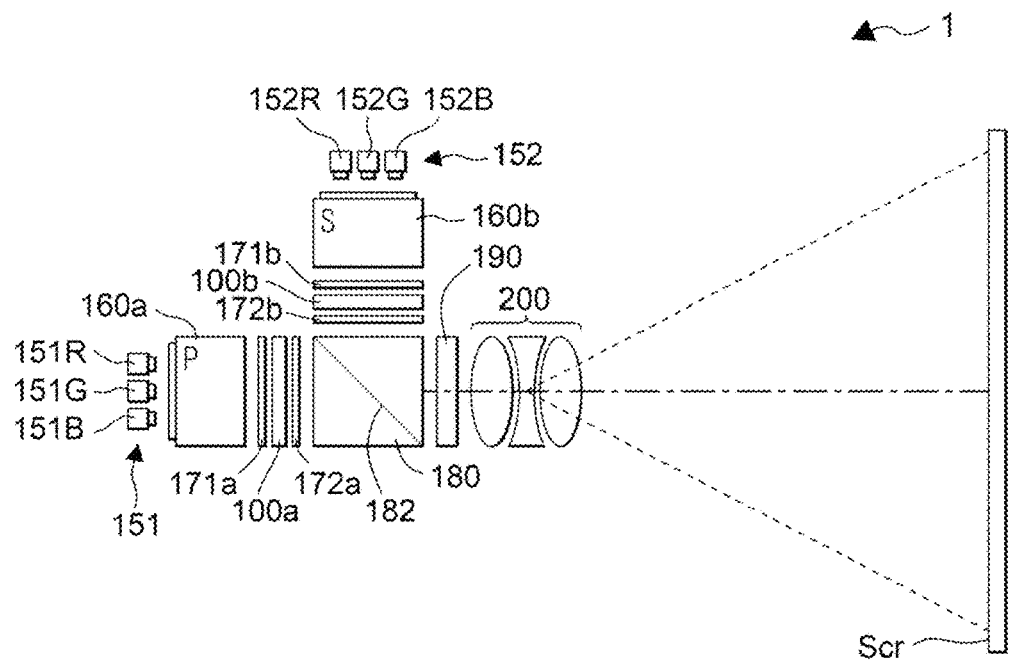
FIG. 1 is a diagram illustrating a projection display device according to a first embodiment.

FIG. 1 is a diagram illustrating an optical configuration of a projection display device 1 according to a first embodiment. The projection display device 1 includes liquid crystal panels 100a and 100b, light sources 151 and 152, optical polarization systems 160a and 160b, a prism 180, a light path shift element 190, and a projection lens 200.

The light source 151 includes laser light sources 151R, 151G, and 151B. Among the laser light sources 151R, 151G, and 151B, the laser light source 151R emits light including a red wavelength range, the laser light source 151G emits light including a green wavelength range, and the laser light source 151B emits light including a blue wavelength range.

The optical polarization system 160a diffuses the light emitted from the laser light sources 151R, 151G, and 151B, forms the light into a substantially parallel light beam with a substantially uniform illuminance, converts the light beam to P-polarized light, and emits the P-polarized light toward the transmissive liquid crystal panel 100a. The conversion to the P-polarized light also includes transmitting the P-polarized light. A polarization plate 171a is provided between an emission surface of the optical polarization system 160a and an incidence surface of the liquid crystal panel 100a, and a polarization plate 172a is provided on an emission surface of the liquid crystal panel 100a.

A transmission axis of the polarization plate 171a is P-polarized light, and a transmission axis of the polarization plate 172a is S-polarized light. To this end, a P-polarized light component not modulated by the liquid crystal panel 100a is blocked by the polarization plate 172a.

The light source 152 includes laser light sources 152R, 152G, and 152B, similar to the light source 151. Among the laser light sources 152R, 152G, and 152B, the laser light source 152R emits light including a red wavelength range, the laser light source 152G emits light in a green wavelength range, and the laser light source 152B emits light in a blue wavelength range.

The optical polarization system 160b diffuses the light emitted from the laser light sources 152R, 152G, and 152B, forms the light into a substantially parallel light beam with a substantially uniform illuminance, converts the light beam into S-polarized light, and emits the S-polarized light toward the transmissive liquid crystal panel 100b. The conversion to the S-polarized light also includes transmitting the S-polarized light. A polarization plate 171b is provided between an emission surface of the optical polarization system 160b and an incidence surface of the liquid crystal panel 100b, and a polarization plate 172b is provided on an emission surface of the liquid crystal panel 100b.

A transmission axis of the polarization plate 171b is S-polarized light, and a transmission axis of the polarization plate 172b is P-polarized light. To this end, an S-polarized light component not modulated by the liquid crystal panel 100b is blocked by the polarization plate 172b.

The liquid crystal panels 100a and 100b include a plurality of pixel circuits, as will be described below. Each of the plurality of pixel circuits includes a liquid crystal element. A liquid crystal element of the liquid crystal panel 100a is driven based on a data signal supplied from a display control circuit, and modulates incident light according to a voltage of the data signal. This modulation changes an amount of light passing through the polarization plate 172a, that is, changes transmittance. To this end, the modulation in the liquid crystal elements is individually controlled based on the data signal so that a transmission image is generated in the liquid crystal panel 100a. Similarly, a transmission image is generated in the liquid crystal panel 100b.

The transmission image from the liquid crystal panel 100a is incident on the prism 180 from a 9 o'clock direction in FIG. 1, and the transmission image from the liquid crystal panel 100b is incident on the prism 180 from a 12 o'clock direction. At a joint surface 182 of the prism 180, the S-polarized light of the transmission image from the liquid crystal panel 100a is transmitted and travels straight, and the P-polarized light of the transmission image from the liquid crystal panel 100b is reflected.

Therefore, the transmission image from the liquid crystal panel 100a and the transmission image from the liquid crystal panel 100b are combined in the prism 180, and a combination image is emitted in a 3 o'clock direction. The combination image from the prism 180 is incident on the projection lens 200 via the light path shift element 190.

The projection lens 200 enlarges and projects the combination image via the light path shift element 190 onto the screen Scr.

The light path shift element 190 shifts a light path of the light emitted from the prism 180 to shift the combination image to be projected onto the screen Scr in a left-right direction or an up-down direction with respect to the projection surface.

At the joint surface 182 of the prism 180, the transmission image from the liquid crystal panel 100a travels straight, whereas the transmission image from the liquid crystal panel 100b is reflected. Therefore, the transmission image from the liquid crystal panel 100b is generated to be horizontally inverted with respect to the transmission image from the liquid crystal panel 100a. Further, the transmission image from the liquid crystal panel 100a and the transmission image from the liquid crystal panel 100b have mismatched pixels and are combined in a shifted state, as will be described below.

Figure 2:
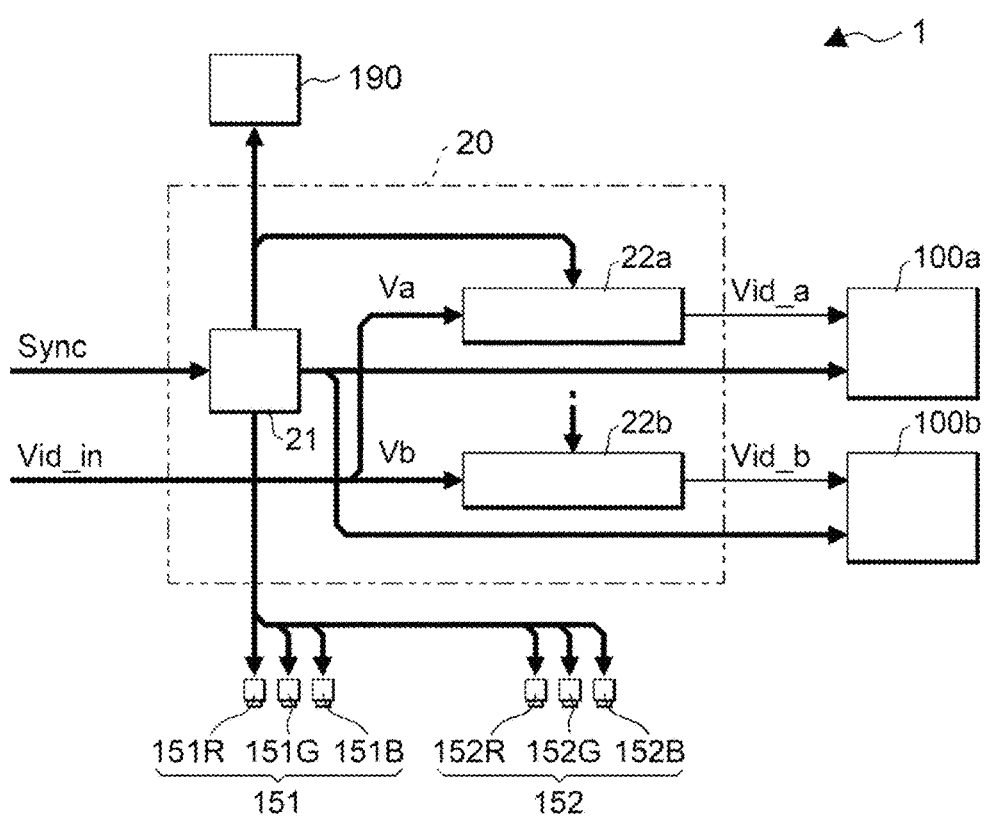
FIG. 2 is a block diagram illustrating a configuration of the projection display device.

FIG. 2 is a block diagram illustrating an electrical configuration of the projection display device 1. As illustrated in the figure, the projection display device 1 includes a display control circuit 20, in addition to the liquid crystal panels 100a and 100b, the light sources 151 and 152, and the light path shift element 190 described above.

Video data Vid_in is supplied from an upper device such as a host device (not illustrated) in synchronization with a synchronization signal Sync. The video data Vid_in designates a gradation level of pixels in an image constituting one-frame period of a video, for example, in 8 bits for each RGB.

The pixels of the image designated by the video data Vid_in are referred to as video pixels, and data for designating the gradation level of the video pixel is referred to as video pixel data, but there may be no particular distinction between the video pixel and the video pixel data. Further, a pixel of an image before or after the combination in the liquid crystal panel 100a or 100b is referred to as a panel pixel. A position of the panel pixel shifted by the light path shift element 190 and projected onto the screen Scr is referred to as a projection position.

In the liquid crystal panels 100a and 100b, panel pixels corresponding to the pixel circuits are arranged in a matrix in a plan view. In the embodiment, an arrangement of the video pixels designated by the video data Vid_in is, for example, twice as large in a vertical direction and twice as large in a horizontal direction as an arrangement of the panel pixels from the liquid crystal panel 100a or 100b.

The synchronization signal Sync includes a vertical synchronization signal for instructing the start of vertical scanning of the video data Vid_in, a horizontal synchronization signal for instructing the start of horizontal scanning, and a clock signal indicating a timing for one video pixel in the video data Vid_in.

The display control circuit 20 includes a processing circuit 21 and conversion circuits 22a and 22b.

The processing circuit 21 controls the conversion circuits 22a and 22b, the liquid crystal panels 100a and 100b, and the light sources 151 and 152 in each writing period which will be described later, based on the synchronization signal Sync, and controls the light path shift element 190 in each period which will be described later. The light path shift element 190 shifts the projection position under the control of the processing circuit 21.

FIG. 3 is a diagram illustrating a part of an arrangement of video pixels represented by the video data Vid_in.

In the figure, A1 to A4 are assigned as symbols in a first row, B1 to B4 in a second row, C1 to C4 in a third row, and D1 to D4 in a fourth row, for convenience, in order to distinguish the video pixels in the video represented by the video data Vid_in.

The description will return to FIG. 2. In the video data Vid_in, video pixel data for designating a gradation level of the video pixel represented by the liquid crystal panel 100a is indicated by Va, and video pixel data for designating a gradation level of the video pixel represented by the liquid crystal panel 100b is indicated by Vb.

The conversion circuit 22a temporarily stores the video pixel data Va for one or more frame periods in an internal buffer, reads video pixel data of a color component corresponding to a writing period, converts the video pixel data into an analog voltage data signal Vid a having a polarity corresponding to the writing period, and supplies the data signal to the liquid crystal panel 100a.

The conversion circuit 22b is different from the conversion circuit 22a only in the video pixel data that is a conversion target, and is the same as the conversion circuit 22a in other respects. That is, the conversion circuit 22b temporarily stores the video pixel data Vb, reads the video pixel data of the color component corresponding to the writing period, converts the video pixel data into an analog voltage data signal Vid b having a polarity corresponding to the writing period, and supplies the data signal to the liquid crystal panel 100b.

A gradation level of which video pixel designated by the video pixel data Va and Vb will be described later.

FIG. 4 is a diagram illustrating the panel pixels corresponding to the arrangement of the video pixels in FIG. 3 among the panel pixels of the liquid crystal panel 100a and the panel pixels of the liquid crystal panel 100b.

For convenience of description, the panel pixels of the liquid crystal panel 100a are indicated as panel pixels a, and the panel pixels of the liquid crystal panel 100b are indicated as panel pixels b.

In an arrangement on a left side, a1 and a2 are assigned as symbols in a first row and a3 and a4 are assigned in a second row, for convenience, in order to distinguish the panel pixels a from each other, and in an arrangement on a right side, b1 and b2 are assigned in a first row and b3 and b4 are assigned in a second row, for convenience, in order to distinguish the panel pixels b.

As will be described later, in the liquid crystal panels 100a and 100b, a microlens is provided in each panel pixel in order to improve the efficiency of light use. To this end, the brightness of the panel pixel is not uniform when viewed in a plan view, and in reality, the panel pixel becomes bright near a center of the panel pixel and becomes dark from the vicinity of the center to the outside. In the figure, circles of the panel pixels a and b simply indicate portions that become brighter than other portions due to light collection in the microlens. A center of the circle substantially coincides with a diagonal center of the panel pixel a or b.

The dispositions of the panel pixels a and b with respect to the prism 180 have a relationship shown on a lower side of FIG. 4. In detail, the arrangement of the panel pixels b is shifted in a right direction in the figure by 0.5 pixels of the panel pixel with respect to the arrangement of the panel pixels a. Specifically, a center of the panel pixel b1 is located between a center of the panel pixel a1 and a center of the panel pixel a2, and a center of the panel pixel b3 is located between a center of the panel pixel a3 and a center of the panel pixel a4.

Next, the liquid crystal panels 100a and 100b will be described.

The liquid crystal panels 100a and 100b are different in only data signals to be supplied, and are the same in a structure. Therefore, the liquid crystal panels 100a and 100b will be generally described using 100 as a reference sign without any one of the liquid crystal panels 100a and 100b being specified.

Figure 6:
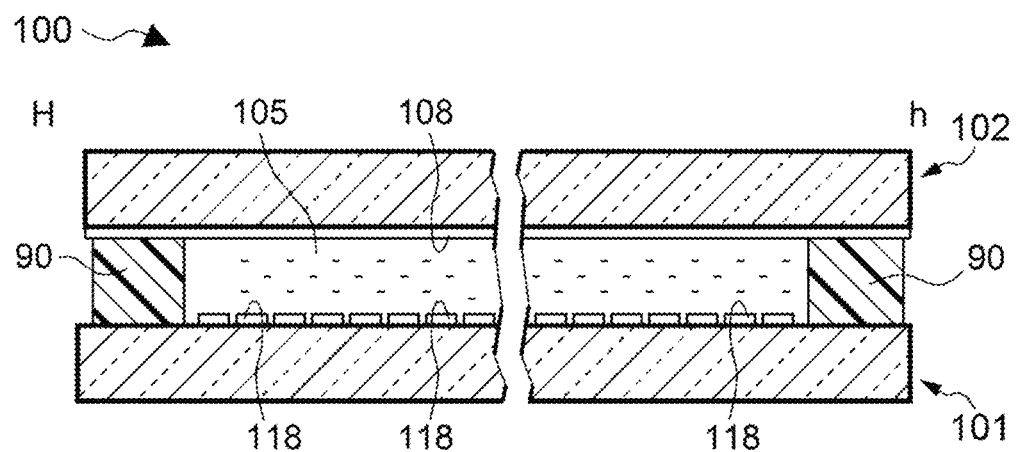
FIG. 6 is a cross-sectional view illustrating the structure of the liquid crystal panel.

FIG. 5 is a perspective view of the liquid crystal panel 100, and FIG. 6 is a cross-sectional view taken along a line H-h in FIG. 5.

As illustrated in these figures, in the liquid crystal panel 100, an element substrate 101 on which pixel electrodes 118 are provided and a counter substrate 102 on which a common electrode 108 is provided are bonded by a seal material 90 so that electrode formation surfaces face each other while maintaining a certain gap, and this gap is filled with a liquid crystal 105.

As the element substrate 101 and the counter substrate 102, a substrate having optical transparency, such as glass or quartz, is used. As illustrated in FIG. 5, one side of the element substrate 101 protrudes from the counter substrate 102. In this protruding area, a plurality of terminals 106 are provided along a horizontal direction in FIG. 5. One end of a flexible printed circuit (FPC) substrate (not illustrated) is coupled to the plurality of terminals 106. The other end of the FPC substrate is coupled to the display control circuit 20, and the above-described various signals are supplied.

On a surface of the element substrate 101 facing the counter substrate 102, the pixel electrodes 118 are provided by patterning a transparent conductive layer such as indium tin oxide (ITO).

Further, although not illustrated, a microlens is provided in each panel pixel on the counter substrate 102 (or the element substrate 101) in order to efficiently send a large amount of light to an opening that becomes the panel pixel. With this configuration, light blocked by a light shielding portion is sent to an opening of the microlens, thereby improving the efficiency of light use. The light shielding portion is provided to determine an outer edge of the panel pixels or to prevent light leakage in the transistor.

Figure 7:
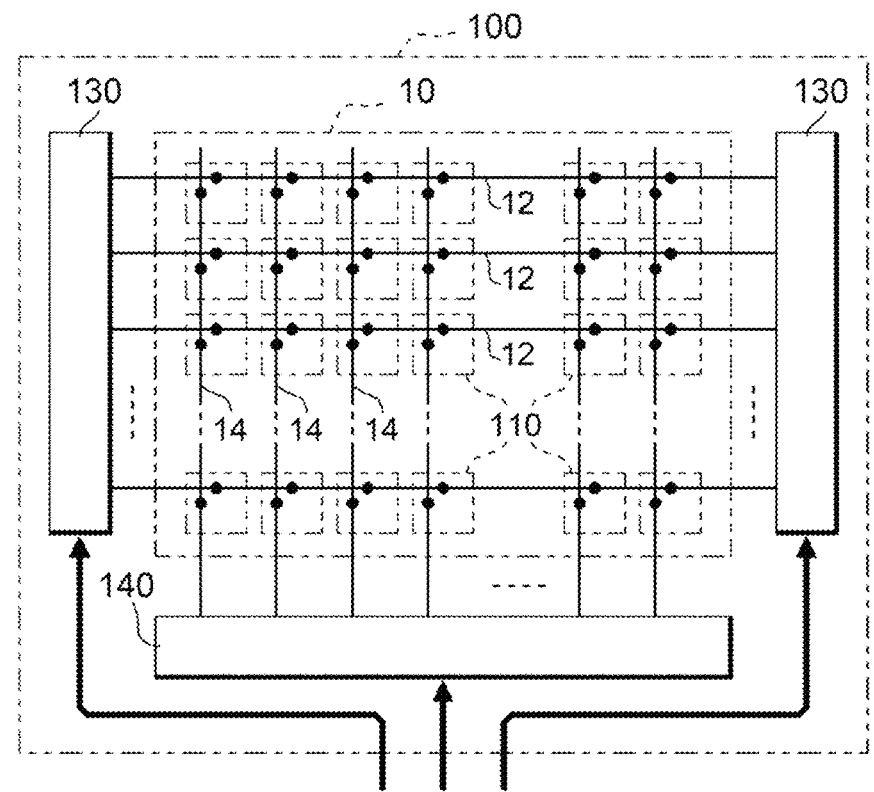
FIG. 7 is a block diagram illustrating an electrical configuration of the liquid crystal panel.

FIG. 7 is a block diagram illustrating an electrical configuration of the liquid crystal panel 100. The liquid crystal panel 100 is provided with a scanning line driving circuit 130 and a data line driving circuit 140 on a periphery of the display area 10.

In the display area 10, pixel circuits 110 are arranged in a matrix. In detail, in the display area 10, a plurality of scanning lines 12 are provided to extend in a horizontal direction in the figure, and a plurality of data lines 14 are provided to extend in a vertical direction and to be electrically insulated from the scanning lines 12. The pixel circuits 110 are provided in a matrix to correspond to intersections between the plurality of scanning lines 12 and the plurality of data lines 14.

When the number of scanning lines 12 is m and the number of data lines 14 is n, the pixel circuits 110 are arranged in a matrix of m vertical rows and n horizontal columns. Both m and n are integers equal to or equal to 2. In order to distinguish the rows of the matrix in the scanning lines 12 and the pixel circuits 110, the rows may be referred to as 1, 2, 3, . . . , (m−1), mth row in order from the top in the figure. Similarly, in order to distinguish the columns of the matrix in the data lines 14 and the pixel circuits 110, the columns may be referred to as 1, 2, 3, . . . , (n−1), nth column in order from the left in the figure.

Since the video pixels are arranged twice as large a vertical direction and twice as large in a horizontal direction as the arrangement of the panel pixels, the arrangement of the video pixels is (2m) rows (2n) columns.

"Row" and "column" are relative concepts, and when one of a horizontal (left-right) direction and a vertical (up-down) direction is defined as the "row", the other of is defined as the "column". However, in the present description, for convenience, a horizontal direction in which the scanning line 12 extends is defined as the "row", and a vertical direction in which the data line 14 extends is defined as the "column". The same is applied to an odd-numbered row and an even-numbered row and to an odd-numbered column and an even-numbered column, and when one of the horizontal direction and the vertical direction is defined as an odd-numbered row and an even-numbered row, the other of the horizontal direction and the vertical direction is defined as an odd-numbered column and an even-numbered column.

Further, an integer i of 1 or more and m or less may be used to generally describe the rows of the scanning lines 12, the panel pixels, or the video pixels. Further, an integer j of 1 or more and n or less may be used to generally describe the columns of the data lines 14, the panel pixels, or the video pixels.

The scanning line driving circuit 130 selects the scanning lines 12 one by one in order of, for example, the first, second, third, . . . , mth rows under the control of the display control circuit 20, and sets a scanning signal to the selected scanning line 12 to a H level. The scanning line driving circuit 130 sets a scanning signal to the scanning lines 12 other than the selected scanning line 12 to a L level.

The data line driving circuit 140 outputs a data signal supplied from the corresponding conversion circuit 22a or 22b to the pixel circuits 110 of the columns 1 to n located on the scanning line 12 via the data line 14 in a period in which the scanning signal to the scanning line 12 has reached the H level.

Figure 8:
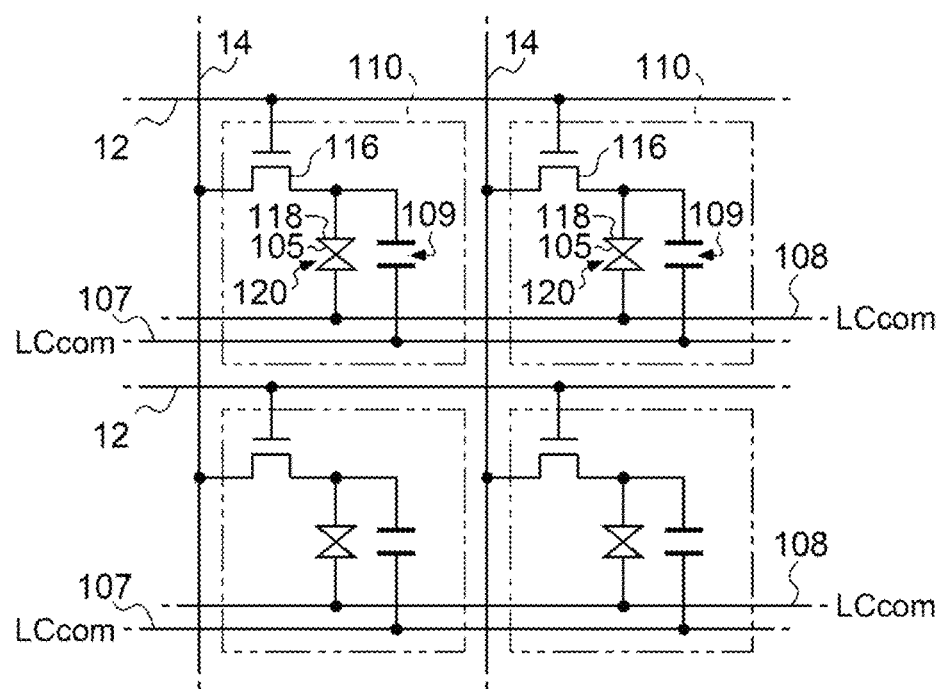
FIG. 8 is a diagram illustrating a configuration of a pixel circuit in a liquid crystal panel.

FIG. 8 is a diagram illustrating an equivalent circuit of four pixel circuits 110 in total including two vertical rows two horizontal columns that correspond to intersections of two adjacent scanning lines 12 and two adjacent data lines 14.

As illustrated in FIG. 8, the pixel circuit 110 includes a transistor 116 and a liquid crystal element 120. The transistor 116 is, for example, an n-channel thin film transistor. In the pixel circuit 110, the transistor 116 has a gate node coupled to the scanning line 12, a source node coupled to the data line 14, and a drain node coupled to the pixel electrode 118 having a square shape in a plan view.

The common electrode 108 is provided in common to all the pixels to face the pixel electrode 118. A voltage LCcom is applied to the common electrode 108. As described above, the liquid crystal 105 is sandwiched between the pixel electrodes 118 and the common electrode 108. Therefore, the liquid crystal element 120 in which the liquid crystal 105 is sandwiched between the pixel electrodes 118 and the common electrode 108 is formed in each pixel circuit 110.

Further, a storage capacitor 109 is provided in parallel with the liquid crystal element 120. The storage capacitor 109 has one terminal coupled to the pixel electrode 118, and the other terminal coupled to a capacitance line 107. A voltage that is constant over time such as the voltage LCcom that is the same as the voltage applied to the common electrode 108 is applied to the capacitance line 107. Since the pixel circuits 110 are arranged in a matrix in a horizontal direction which is a direction in which the scanning lines 12 extend and a vertical direction which is a direction in which the data lines 14 extend, the pixel electrodes 118 included in the pixel circuits 110 are also arranged in a matrix in the vertical direction and the horizontal direction.

In the scanning line 12 on which the scanning signal has reached the H level, the transistor 116 of the pixel circuit 110 provided to correspond to the scanning line 12 enters an on state. Since the data line 14 and the pixel electrode 118 are electrically coupled when the transistor 116 enters the on state, the data signal supplied to the data line 14 reaches the pixel electrode 118 through the transistor 116 that has entered the on state. When the scanning line 12 becomes at the L level, the transistor 116 enters an off state, but a voltage of the data signal that has reached the pixel electrode 118 is held by a capacitance of the liquid crystal element 120 and the storage capacitor 109.

As is well known, in the liquid crystal element 120, orientation of liquid crystal molecules changes depending on an electric field generated by the pixel electrode 118 and the common electrode 108. Therefore, the liquid crystal element 120 has a transmittance according to an effective value of an applied voltage.

An area of the liquid crystal element 120 functioning as a panel pixel, that is, an area having a transmittance according to the effective value of the voltage is an area where the pixel electrode 118 and the common electrode 108 overlap when the element substrate 101 and the counter substrate 102 are viewed in plan. Since the pixel electrode 118 has the square shape in plan view, a shape of the panel pixel of the liquid crystal panel 100 is also a square shape.

Further, in the present embodiment, the liquid crystal 105 is of a vertical alignment (VA) type, and is in a normally black mode in which a transmittance is lowest when a voltage applied to the liquid crystal element 120 is zero, and increases as the applied voltage increases.

A writing operation for supplying the data signal to the pixel electrode 118 of the liquid crystal element 120 is executed in order of the first, second, third, . . . , mth rows. Accordingly, a voltage corresponding to the data signal is held in each of the liquid crystal elements 120 of the pixel circuits 110 arranged in m rows n columns, each liquid crystal element 120 has a desired transmittance, and a transmission image is generated by the liquid crystal elements 120 arranged in m rows n columns.

Since application of a DC voltage to the liquid crystal element 120 causes deterioration of the liquid crystal 105, a positive voltage and a negative voltage are applied alternately to the pixel electrode 118 of the liquid crystal element 120. That is, the liquid crystal element 120 is driven by an AC voltage. A reference of the polarity is generally the voltage LCcom applied to the common electrode 108. A case where a data signal higher than the voltage LCcom is applied to the pixel electrode 118 is called positive polarity writing, and a case where a data signal lower than the voltage LCcom is applied is called negative polarity writing. The reference of the polarity may be a voltage different from the voltage LCcom in consideration of push-down of the transistor 116.

As described above, when the combination is performed by the prism 180, the arrangement of the panel pixels a and the arrangement of the panel pixels b are shifted by the 0.5 pixels of the panel pixel in the right direction. To this end, in the combination image of the transmission images from the liquid crystal panels 100a and 100b, the panel pixels are arranged in m rows (2n) columns.

Since the video pixels of the image designated by the video data Vid_in are arranged in (2m) rows (2n) columns, the combination image lacks resolution in the vertical direction (column direction).

Then, an operation for doubling the resolution in a vertical direction of the combination image and causing the combination image to be visually recognized will be described next.

Figure 9:
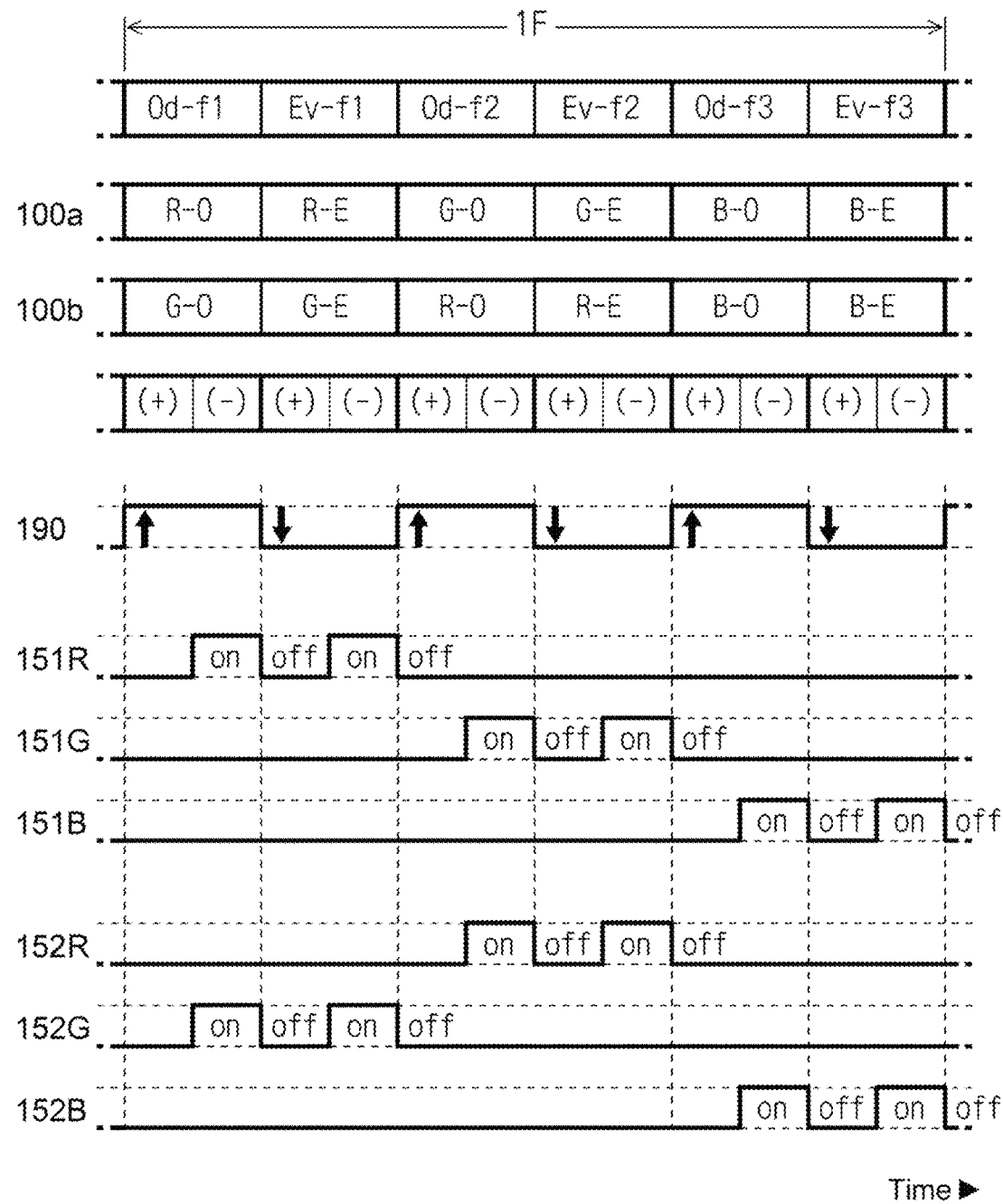
FIG. 9 is a diagram illustrating an operation in a one-frame period of a projection display device.

FIG. 9 is a diagram illustrating an operation of the projection display device 1 according to the first embodiment.

As illustrated in the figure, in the present embodiment, one-frame period (1F) is divided into six unit periods. The six unit periods are Od-f1, Ev-f1, Od-f2, Ev-f2, Od-f3, and Ev-f3 in chronological order.

The one-frame period (1F) is a period in which one frame of the video represented by the video data Vid_in is supplied, and is 16.7 milliseconds of one cycle when a frequency of the vertical synchronization signal included in the synchronization signal Sync is 60 Hz.

Further, the unit period (Od-f1) is a period in which the panel pixel a of the liquid crystal panel 100a and the panel pixel b of the liquid crystal panel 100b represents the video pixels in the odd-numbered rows among the video pixels, which is a color component of one of three primary colors of RGB.

In detail, in the unit period (Od-f1), the panel pixel a represents a R component (R-O) of the video pixel in the odd-numbered rows and the odd-numbered columns among the video pixels, and the panel pixel b represents a G component (G-O) of the video pixel in the odd-numbered rows and the even-numbered columns.

The unit period (Ev-f1) is a period in which the panel pixels a and b represent video pixels in the even-numbered rows among the video pixels, which are the same color components of the three primary colors of RGB as those in the immediately preceding unit period (Od-f1). In detail, in the unit period (Ev-f1), the panel pixel a represents an R component (R-E) of the video pixel in the even-numbered rows and the odd-numbered columns among the video pixels, and the panel pixel b represents a G component (G-E) of the video pixel in the even-numbered row and the even-numbered column among the video pixels.

Next, the unit period (Od-f2) is a period in which the panel pixels a and b represent the video pixels in the odd-numbered rows among the video pixels, which are different color components of the three primary colors of RGB from those in the unit period (Od-f1) or the unit period (Ev-f1).

In detail, in the unit period (Od-f2), the panel pixel a represents the G component (G-O) of the video pixel in the odd-numbered rows and the odd-numbered columns among the video pixels, and the panel pixel b represents the R component (R-O) of the video pixel in the odd-numbered rows and the even-numbered columns among the video pixels.

The unit period (Ev-f2) is a period in which the panel pixels a and b represent video pixels in the even-numbered rows among the video pixels, which are the same color components of the three primary colors of RGB as those in the immediately preceding unit period (Od-f2). In detail, in the unit period (Ev-f2), the panel pixel a represents the G component (G-E) of the video pixel in the even-numbered row and the odd-numbered column among the video pixels, and the panel pixel b represents the R component (R-E) of the video pixel in the even-numbered row and the even-numbered column among the video pixels.

The unit period (Od-f3) is a period in which the panel pixels a and b represent video pixels in the odd-numbered rows among the video pixels, which are one remaining color component among the three primary colors RGB. In detail, in the unit period (Od-f3), the panel pixel a represents the B component (B-O) of the video pixel in the odd-numbered row and the odd-numbered column among the video pixels, and the panel pixel b represents the B component (B-O) of the video pixel in the odd-numbered row and the even-numbered column among the video pixels.

The unit period (Ev-f3) is a period in which the panel pixels a and b represent video pixels in the odd-numbered rows among the video pixels, which are one remaining color component among the three primary colors RGB. In detail, in the unit period (Ev-f3), the panel pixel a represents a B component (B-E) of the video pixel in the even-numbered rows and the odd-numbered columns among the video pixels, and the panel pixel b represents the B component (B-E) of the video pixel in the even-numbered row and the even-numbered column among the video pixels.

In the unit periods (Od-f1, Ev-f1, Od-f2, Ev-f2, Od-f3, and Ev-f3), the conversion circuit 22a supplies the data signal Vid a corresponding to the video pixel represented by the panel pixel a to the liquid crystal panel 100a. Further, in the unit periods (Od-f1, Ev-f1, Od-f2, Ev-f2, Od-f3, and Ev-f3), the conversion circuit 22b supplies a data signal Vid b corresponding to the video pixel represented by the panel pixel b to the liquid crystal panel 100b.

In the unit periods (Od-f1, Od-f2, and Od-f3), the video pixel in the odd-numbered row and the odd-numbered column represented by the panel pixel a is the video pixel in a (2i−1)-th row and a (2j−1)-th column when the panel pixel a is in an i-th row and a j-th column. In the same period, the video pixel in the odd-numbered row and the even-numbered column represented by the panel pixel b is the video pixel in a (2i−1)-th row and a 2j-th column when the panel pixel b is in an i-th row and a j-th column.

In the unit periods (Ed-f1, Ed-f2, and Ed-f3), the video pixel in the even-numbered row and the odd-numbered column represented by the panel pixel a is the video pixel in a 2i-th row and a (2j−1)-th column when the panel pixel a is in an i-th row and a j-th column. In the same period, the video pixel in the even-numbered row and the even-numbered column represented by the panel pixel b is the video pixel in a 2i-th row and a 2j-th column when the panel pixel b is in an i-th row and a j-th column.

When the panel pixel "represents" a certain video pixel, this means a state in which the liquid crystal element 120 of the panel pixel has a transmittance corresponding to the gradation level (video pixel data) of the video pixel.

When the one-frame period (1F) is 16.7 milliseconds, each of the unit periods (Od-f1, Ev-f1, Od-f2, Ev-f2, Od-f3, and Ev-f3) is 2.78 milliseconds of ⅙. Further, each of the unit periods (Od-f1, Ev-f1, Od-f2, Ev-f2, Od-f3, and Ev-f3) is further divided into a writing period (+) for writing a data signal having a positive polarity and a writing period (−) for writing a data signal having a negative polarity. For convenience, the positive writing period (+) comes first, and the negative writing period (−) comes later.

In the first embodiment, the processing circuit 21 controls the light path shift element 190 as follows. That is, the processing circuit 21 sets the projection position by the light path shift element 190 to a first point in the unit periods (Od-f1, Od-f2, and Od-f3) and to a second point in the unit periods (Ev-f1, Ev-f2, and Ev-f3). The second point is a point shifted in the downward direction by the 0.5 pixels of the panel pixel from the first point.

Here, the first point of the projection position is set as the reference position. When the unit period (Ev-f1, Ev-f2, or Ev-f3) arrives, the processing circuit 21 controls the light path shift element 190 so that the light path shift element 190 shifts the projection position in the downward direction by the 0.5 pixels of the panel pixel. When the unit period (Ev-f1, Ev-f2, or Ev-f3) ends and the unit period (Od-f1, Od-f2, or Od-f3) arrives, the processing circuit 21 controls the light path shift element 190 so that the light path shift element 190 shifts the projection position in an upward direction by the 0.5 pixels of the panel pixel and returns the projection position to the reference position.

The downward direction is a vertical scanning direction, that is, a direction in which the scanning lines 12 are selected in order, and is, for example, a direction from the panel pixel a1 to a3 in FIG. 4.

Further, in FIG. 9, when the control signal to the light path shift element 190 is at the H level, the projection position is the first point of the reference position, and when the control signal is at the L level, the projection position is the second point shifted in the downward direction by the 0.5 pixels of the panel pixel from the reference position.

The processing circuit 21 controls the light sources 151 and 152 as follows.

In detail, first, the processing circuit 21 controls the laser light sources 151R and 152G so that the laser light sources 151R and 152G enter the on state and controls the other laser light sources so that the other laser light sources enter the off state in the negative polarity writing period (−) of the unit period (Od-f1) and the negative polarity writing period (−) of the unit period (Ev-f1). The on state in the laser light source refers to a state in which the laser light source emits light, and the off state in the laser light source refers to a state in which the laser light source does not emit light.

Second, the processing circuit 21 controls the laser light sources 151G and 152R so that the laser light sources 151G and 152R enter the on state, and controls the other laser light sources so that the other laser light sources enter the off state in the negative polarity writing period (−) of the unit period (Od-f2) and in a negative polarity writing period (−) of the unit period (Ev-f2).

Third, the processing circuit 21 controls the laser light sources 151B and 152B so that the laser light sources 151B and 152B enter the on state, and controls the other laser light sources so that the other laser light sources enter the off state in the negative polarity writing period (−) of the unit period (Od-f3) and in a negative polarity writing period (−) of the unit period (Ev-f3).

In the positive polarity writing period (+) which is the other period of the one-frame period (1F), the processing circuit 21 controls all the laser light sources 151R, 151G, 151B, 152R, 152G, and 152B so that the laser light sources enter the off state.

Figure 10:
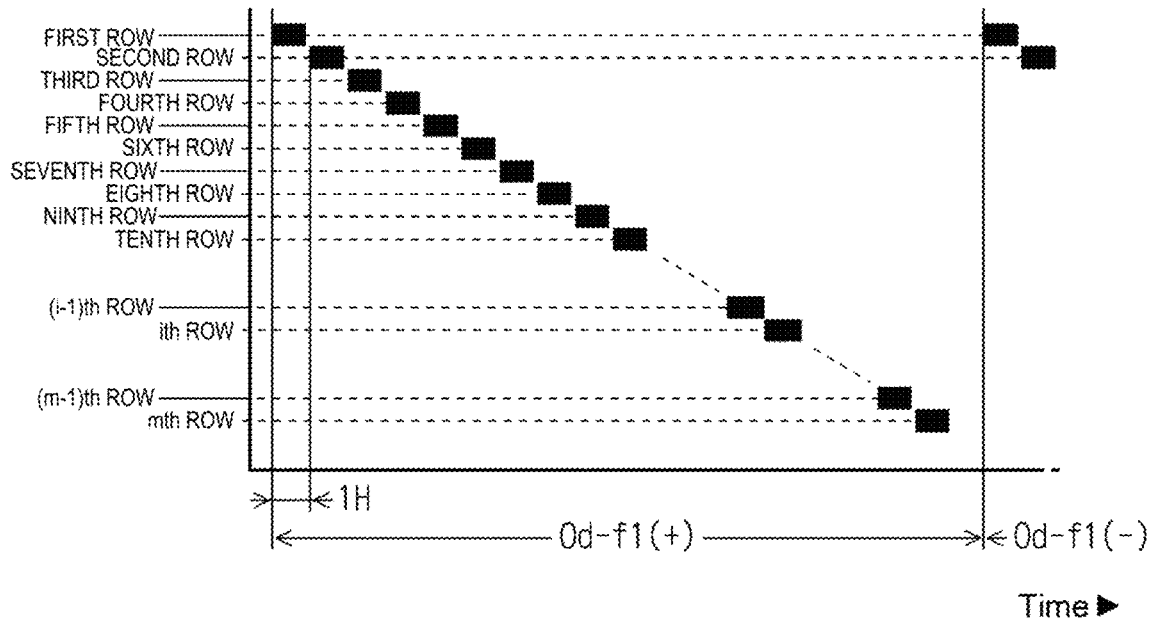
FIG. 10 is a diagram illustrating a writing operation in a liquid crystal panel.

FIG. 10 is a diagram illustrating a time transition of the scanning lines 12 that are selected in the liquid crystal panel 100, with a vertical axis representing the number of rows of the scanning lines 12 from the first row to the mth row, and a horizontal axis representing an elapsed time. In the figure, an example of a positive polarity writing period (+) in the unit period (Od-f1) will be described.

When the selection of the scanning lines 12 is indicated by a thick black line, the scanning lines 12 are exclusively selected row by row in each horizontal scanning period (1H), so that the selected scanning lines 12 are shifted one by one from the first row to the mth row over time.

The positive polarity writing period (+) in the unit period (Od-f1) is followed by a negative polarity writing period (−). The scanning lines 12 are exclusively selected in order from the first row to the mth row in each horizontal scanning period (1H) similarly in the negative polarity writing period (−).

Further, although the unit period (Od-f1) has been described herein, the scanning lines 12 are exclusively selected in each horizontal scanning period (1H) in order from the first row to the mth row similarly in the writing periods of the other unit periods (Ev-f1, Od-f2, Ev-f2, Od-f3 and Ev-f3).

Figure 11:
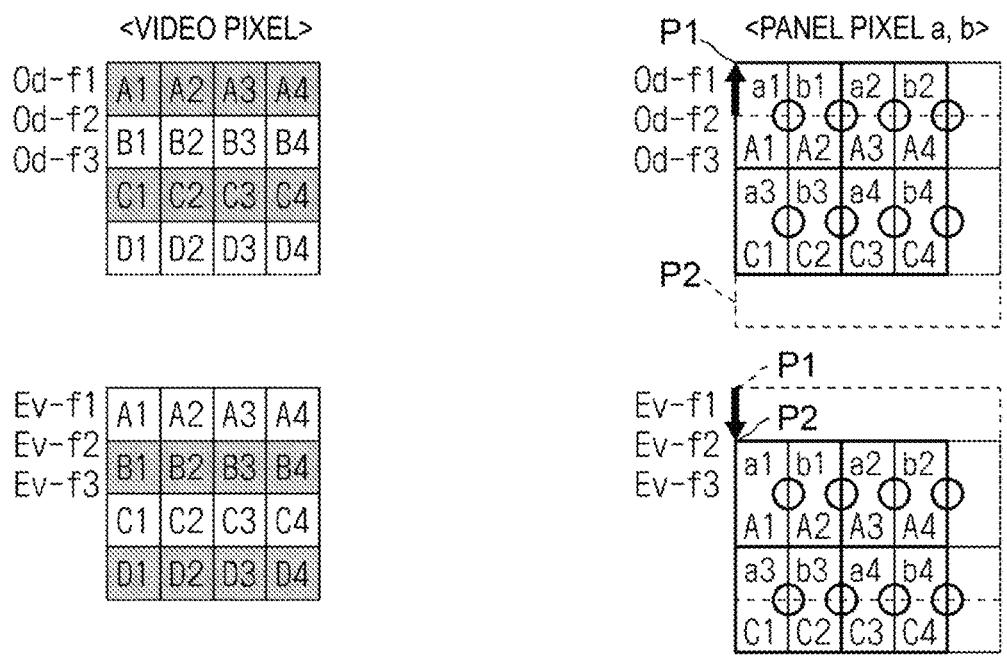
FIG. 11 is a diagram illustrating a relationship between video pixels, panel pixels, and projection positions in a one-frame period.

FIG. 11 is a diagram illustrating which video pixels and at which projection positions the panel pixels a and b represent in the first embodiment. In detail, FIG. 11 is a diagram illustrating at what projection positions four panel pixels a1 to a4 on the upper left side of FIG. 4 and four the panel pixels b1 to b4 on the upper right side of FIG. 4 represent the video pixels illustrated in FIG. 3 in the unit periods (Od-f1, Od-f2, and Od-f3) and the unit periods (Ev-f1, Ev-f2, and Ev-f3).

First, in the unit period (Od-f1), the panel pixels a1 to a4 represent the R components of the video pixels A1, A3, C1, and C3 in the odd-numbered rows and the odd-numbered columns. In the writing period (–) of the unit period (Od-f1), since the laser light source 151R enters the on state, the R components of the video pixels A1, A3, C1, and C3 represented by the panel pixels a1 to a4 are visually recognized by the user.

Further, in the unit period (Od-f1), the panel pixels b1 to b4 represent the G components of the video pixels A2, A4, C2, and C3 in the odd-numbered rows and the even-numbered columns. In the writing period (–) of the unit period (Od-f1), since the laser light source 152G enters the on state, the G components of the video pixels A2, A4, C2, and C4 represented by the panel pixels b1 to b4 are visually recognized by the user.

In the next unit period (Ev-f1), the panel pixels a1 to a4 represent the R components of the video pixels B1, B3, D1, and D3 in the even-numbered rows and the odd-numbered columns. In the writing period (–) of the unit period (Ev-f1), since the laser light source 151R enters the on state, the R components of the video pixels B1, B3, D1, and D3 represented by the panel pixels a1 to a4 are visually recognized by the user.

Further, in the unit period (Ev-f1), the panel pixels b1 to b4 represent the G components of the video pixels B2, B4, D2, and D4 in the even-numbered rows and the even-numbered columns. In the writing period (–) of the unit period (Ev-f1), since the laser light source 152G enters the on state, the G components of the video pixels B2, B4, D2, and D4 represented by the panel pixels b1 to b4 are visually recognized by the user.

The projection position in the unit period (Ev-f1) is the second point P2, which is shifted in the downward direction by the 0.5 pixels of the panel pixel from the first point P1, which is the projection position in the unit period (Od-f1).

To this end, the R components of the video pixels in the odd-numbered rows and the odd-numbered columns, the G components of the video pixels in the odd-numbered rows and the even-numbered columns, the R components of the video pixel in the even-numbered rows and the odd-numbered columns, and the G components of the video pixel in the even-numbered row and the even-numbered column are visually recognized by the user when viewed throughout the unit periods (Od-f1 and Ev-f1).

In the unit period (Od-f2), the panel pixels a1 to a4 represent the G components of the video pixels A1, A3, C1, and C3 in the odd-numbered rows and the odd-numbered columns. In the writing period (–) of the unit period (Od-f2), since the laser light source 151G enters the on state, the G components of the video pixels A1, A3, C1, and C3 represented by the panel pixels a1 to a4 are visually recognized by the user.

Further, in the unit period (Od-f2), the panel pixels b1 to b4 represent the R components of the video pixels A2, A4, C2, and C4 in the odd-numbered rows and the even-numbered columns. In the writing period (–) of the unit period (Od-f2), since the laser light source 152R enters the on state, the R components of the video pixels A2, A4, C2, and C4 represented by the panel pixels b1 to b4 are visually recognized by the user.

In the next unit period (Ev-f2), the panel pixels a1 to a4 represent the G components of the video pixels B1, B3, D1, and D3 in the even-numbered rows and the odd-numbered columns. In the writing period (–) of the unit period (Ev-f2), since the laser light source 151G enters the on state, the G components of the video pixels B1, B3, D1, and D3 represented by the panel pixels a1 to a4 are visually recognized by the user.

Further, in the unit period (Ev-f2), the panel pixels b1 to b4 represent the R components of the video pixels B2, B4, D2, and D4 in the even-numbered rows and the even-numbered columns. In the writing period (–) of the unit period (Ev-f2), since the laser light source 152R enters an on state, the R components of the video pixels B2, B4, D2, and D4 represented by the panel pixels b1 to b4 are visually recognized by the user.

The projection position in the unit period (Ev-f2) is the second point P2, and is shifted in the downward direction by the 0.5 pixels of the panel pixel from the first point P1, which is the projection position in the unit period (Od-f2).

To this end, the G components of the video pixels in the odd-numbered rows and the odd-numbered columns, the R components of the video pixels in the odd-numbered rows and the even-numbered columns, the G components of the video pixels in the even-numbered rows and the odd-numbered columns, and the R components of the video pixels in the even-numbered rows and the even-numbered columns are visually recognized by the user when viewed throughout the unit periods (Od-12 and Ev-f2).

In the unit period (Od-f3), the panel pixels a1 to a4 represent the B components of the video pixels A1, A3, C1, and C3 in the odd-numbered rows and the odd-numbered columns. In the writing period (–) of the unit period (Od-f3), since the laser light source 151B enters the on state, the B components of the video pixels A1, A3, C1, and C3 represented by the panel pixels a1 to a4 are visually recognized by the user.

Further, in the unit period (Od-f2), the panel pixels b1 to b4 represent the B components of the video pixels A2, A4, C2, and C4 in the odd-numbered rows and the even-numbered columns. In the writing period (–) of the unit period (Od-f3), since the laser light source 152B enters the on state, the B components of the video pixels A2, A4, C2, and C4 represented by the panel pixels b1 to b4 are visually recognized by the user.

In the next unit period (Ev-f3), the panel pixels a1 to a4 represent B components of the video pixels B1, B3, D1, and D3 in the even-numbered rows and the odd-numbered columns. In the writing period (–) of the unit period (Ev-f3), since the laser light source 151B is in the on state, the B components of the video pixels B1, B3, D1, and D3 represented by the panel pixels a1 to a4 are visually recognized by the user.

Further, in the unit period (Ev-f3), the panel pixels b1 to b4 represent the B components of the video pixels B2, B4, B2, and B4 in the even-numbered rows and the even-numbered columns. In the writing period (–) of the unit period (Ev-f3), since the laser light source 152B enters an on state, the B components of the video pixels B2, B4, D2, and D4 represented by the panel pixels b1 to b4 are visually recognized by the user.

The projection position in the unit period (Ev-f3) is the second point P2, and is shifted in the downward direction by the 0.5 pixels of the panel pixel from the first point P1, which is the projection position in the unit period (Od-f3).

To this end, B components of the video pixels in the odd-numbered rows and the odd-numbered columns, B components of the video pixels in the odd-numbered rows and the even-numbered columns, B components of the video pixels in the even-numbered rows and the odd-numbered columns, and B components of the video pixels in the even-numbered rows and the even-numbered columns are visually recognized by the user when viewed throughout the unit periods (Od-f3 and Ev-f3).

Therefore, when viewed throughout the one-frame period (1F), specifically, from the unit period (Od-f1) to the unit period (Ev-f3), the video pixels arranged in ($2m$) rows ($2n$) columns are visually recognized in color by the user due to the combination image and shift of the liquid crystal panels 100*a* and 100*b*.

Here, a projection display device according to a comparative example will be described in order to describe the advantages of the projection display device 1 according to the embodiment. A configuration of the projection display device according to the comparative example is the same as the configuration of the projection display device 1 according to the embodiment, but operations are different from each other.

Figure 19:
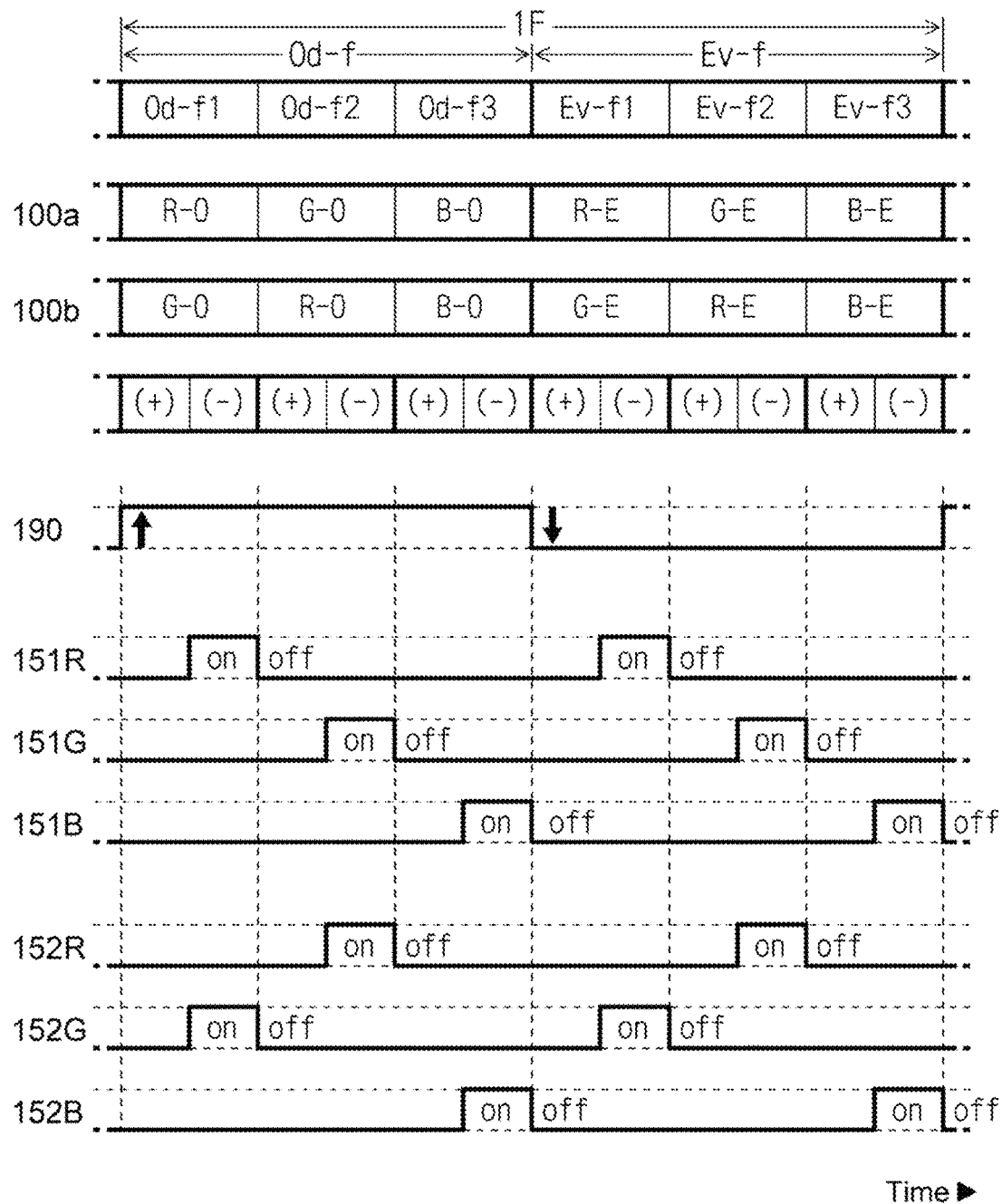
FIG. 19 is a diagram illustrating an operation in a one-frame period of a projection display device according to a comparative example.

FIG. 19 is a diagram illustrating an operation in one-frame period (1F) of the projection display device according to the comparative example.

In the comparative example, the one-frame period (1F) is divided into an odd-numbered field period (Od-f) and an even-numbered field period (Ev-f). Further, the odd-numbered field period (Od-f) is divided into the unit periods (Od-f1, Od-f2, and Od-f3), and the even-numbered field period (Ev-f) is divided into the unit periods (Ev-f1, Ev-f2, Ev-f3).

In the unit period (Od-f1) of the odd-numbered field period (Od-f), the panel pixel a of the liquid crystal panel 100*a* represents the R component of the video pixel in the odd-numbered row and the odd-numbered column, and the panel pixel b of the liquid crystal panel 100*b* represents the G component of the video pixel in the odd-numbered row and the even-numbered column. Further, in the negative polarity writing period (−) of the unit period (Od-f1), the laser light sources 151R and 152G enter the on state. To this end, in the writing period (−), each of the R component of the video pixel in the odd-numbered row and the odd-numbered column represented by the panel pixel a, and the G component of the video pixel in the odd-numbered row and the even-numbered column represented by the panel pixel b is visually recognized by the user.

Similarly, in the writing period (−) of the unit period (Od-f2), each of the G component of the video image in the odd-numbered row and odd-numbered column represented by the panel pixel a and the R component of the video image in the odd-numbered row and the even-numbered column represented by the panel pixel b is visually recognized by the user.

Further, in the writing period (−) of the unit period (Od-f3), each of the B component of the video image in the odd-numbered row and odd-numbered column represented by the panel pixel a and the B component of the video image in the odd-numbered row and the even-numbered column represented by the panel pixel b is visually recognized by the user.

In the unit period (Ev-f1) of the even-numbered field period (Ev-f), the panel pixel a of the liquid crystal panel 100*a* represents the R component of the video pixel in the even-numbered row and the odd-numbered column, and the panel pixel b of the liquid crystal panel 100*b* represents the G component of the video pixel in the even-numbered row and the even-numbered column. Further, in the negative polarity writing period (−) of the unit period (Ev-f1), the laser light sources 151R and 152G enter the on state. To this end, in the writing period (−), each of the R component of the video pixel in the even-numbered row and the odd-numbered column represented by the panel pixel a, and the G component of the video pixel in the even-numbered row and the even-numbered column represented by the panel pixel b is visually recognized.

Similarly, in the writing period (−) of the unit period (Ev-f2), each of the G component of the video pixel in the even-numbered row and the odd-numbered column represented by the panel pixel a and the R component of the video pixel in the even-numbered row and the even-numbered column represented by the panel pixel b is visually recognized.

Similarly, in the writing period (−) of the unit period (Ev-f3), the B component of the video pixel in the even-numbered row and the odd-numbered column represented by the panel pixel a and the B component of the video pixel in the even-numbered row and the even-numbered column represented by the panel pixel b is visually recognized.

Since the applied voltage is substantially zero when the liquid crystal 105 is of the VA type described above and the transmittance of the liquid crystal element 120 is at a lowest gradation level, the liquid crystal molecules enter a flat alignment state in which the liquid crystal molecules are aligned along a substrate surface direction only through a restrictive force of an alignment film. On the other hand, when the transmittance of the liquid crystal element 120 is at a highest gradation level, the applied voltage is maximized, a restrictive force of an electric field in a direction perpendicular to the substrate surface, that is, a vertical direction is applied to the liquid crystal molecules, and the liquid crystal molecules enter a vertically aligned state in which the liquid crystal molecules are aligned along the vertical direction.

Here, when the gradation level changes from a minimum value to a maximum value, that is, when the gradation level changes from a dark state in which the transmittance is minimum to a bright state in which the transmittance is maximum, the liquid crystal molecules change from a horizontally aligned state to the vertically aligned state. On the other hand, when the gradation level changes from the maximum value to the minimum value, that is, when the gradation level changes from the bright state to the dark state, the liquid crystal molecules change from the vertically aligned state to the horizontally aligned state.

The restrictive force of the alignment film is weaker than a restrictive force in a vertical direction of the applied voltage. To this end, the change from the vertically aligned state to the horizontally aligned state in the liquid crystal molecules becomes slower than change from the horizontally aligned state to the vertically aligned state. Therefore, in a VA type liquid crystal, an optical response from a bright state to a dark state tends to be slower than an optical response from a dark state to a bright state.

What happens when a specific pattern is displayed in a comparative example using a VA type liquid crystal 105 with such a tendency is considered.

The specific pattern is, for example, a pattern in which a gradation level of the R component is a maximum value and gradation levels of the G and B components are minimum values in the video pixel in the odd-numbered column, and a gradation level of the G component is a maximum value and gradation levels of the R and B components are minimum values in the video pixel in the even-numbered column.

Figure 20:
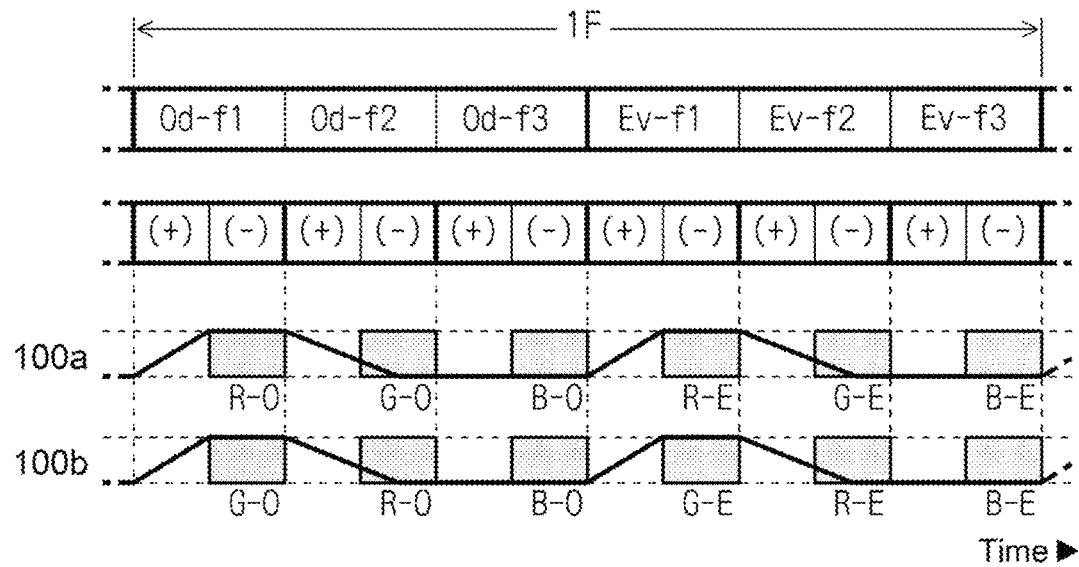
FIG. 20 is a diagram illustrating narrowing of a color reproduction range in the projection display device according to the comparative example.

FIG. 20 is a diagram illustrating an optical response, that is, change in transmittance of the panel pixel a of the liquid crystal panel 100a and the panel pixel b of the liquid crystal panel 100b in the projection display device according to the comparative example.

When the specific pattern described above is displayed, a data signal of a voltage corresponding to a maximum transmittance is written to the liquid crystal element 120 of the panel pixel a with a positive polarity in the writing period (+) and with a positive polarity in the writing period (−) of the unit periods (Od-f1 and Ev-f1) in the comparative example. Similarly, the data signal of the voltage corresponding to the maximum transmittance is written to the liquid crystal element 120 of the panel pixel b with a positive polarity in the writing period (+) and with a positive polarity in the writing period (−).

Meanwhile, in the writing periods (+) and (−) of the periods (Od-f2, Od-f3, Ev-f2, and Ev-f3), a data signal at a voltage corresponding to a minimum transmittance are written to the liquid crystal element 120 of the panel pixel a and the liquid crystal element 120 of the panel pixel b.

Even when the voltage of the data signal is written to the liquid crystal element 120 in this way, the transmittance of the liquid crystal element 120 does not change instantaneously. In detail, even when the data signal of the voltage corresponding to the maximum transmittance is written to the liquid crystal element 120, the transmittance does not change instantaneously, but gradually increases from the minimum transmittance. Further, even when the data signal of the voltage corresponding to the minimum transmittance is written to the liquid crystal element 120, the transmittance does not change instantaneously, but gradually decreases from the maximum transmittance.

In the figure, the transmittance is shown as a linear change by a solid line, but in fact, the transmittance is changed as an integral. Further, this change in transmittance indicates a first row that is written first in the writing periods (+) and (−).

Here, a time required for the transmittance to change from the maximum value to the minimum value is longer than a time required for the transmittance to change from the minimum value to the maximum value.

To this end, the transmittance of the panel pixel a decrease due to the writing of the data signal in the writing period (+) of the unit period (Od-f2) and the writing period (+) of the unit period (Ev-f2), but the laser light source 151G enters the on state before the transmittance is minimized. To this end, the G component is visually recognized in the panel pixel a even though the G component is zero in the video pixel data.

Similarly, the transmittance of the panel pixel b decreases due to the writing of the data signal in the writing period (+) of the unit period (Od-f2) and the writing period (+) of the unit period (Ev-f2), but the laser light source 152R enters the on state before the transmittance is minimized. To this end, the R component is visually recognized in the panel pixel b even though the R component is zero in the video pixel data.

That is, according to the comparative example, even though the panel pixel a is trying to represent only the R component of the video pixels in the odd-numbered row and the odd-numbered column and the even-numbered row and the odd-numbered column, the G component is mixed, so that an apex corresponding to G in a triangle indicating a color space (the color reproduction range) reproducible in the projection display device is closer to Y (yellow).

Further, even though panel pixel b is trying to represent only the G component of the video pixel in the even-numbered row and the odd-numbered column and the even-numbered row and the even-numbered column, the R component is mixed, so that an apex corresponding to R among three apexes of the color reproduction range is closer to Y.

Therefore, in the projection display device according to the comparative example, the color reproduction range is narrowed by an amount of being closer to Y.

Figure 21:
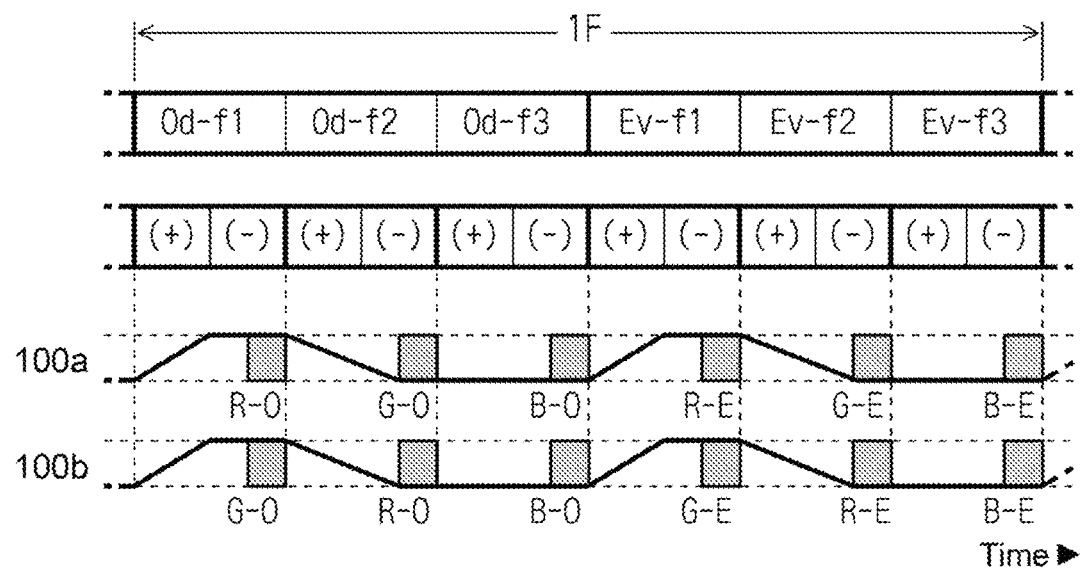
FIG. 21 is a diagram illustrating a decrease in brightness in the projection display device according to the comparative example.

In order to avoid the influence of the color mixing, a period in which the laser light sources 151R, 151G, 151B, 152R, 152G, and 152B enter the on state may be narrowed with reference to an end of the negative polarity writing period (−), as illustrated in FIG. 21. However, when a period in which the laser light source is in the on state is narrowed, a proportion of a period in which the laser light source enters the on state becomes smaller when viewed throughout the one-frame period (1F), making it difficult to secure required brightness.

That is, in the comparative example, securing the color reproduction range and securing the brightness are in a contradictory relationship.

In the comparative example, in order to cause the video pixel in the odd-numbered row to be visually recognized in color in the odd-numbered field period (Od-f) and cause the video pixel in the even-numbered row to be visually recognized in color in the even-numbered field period (Ev-f), color components of the video pixels represented in the same row are different in continuous unit periods. This causes the color mixing.

Figure 12:
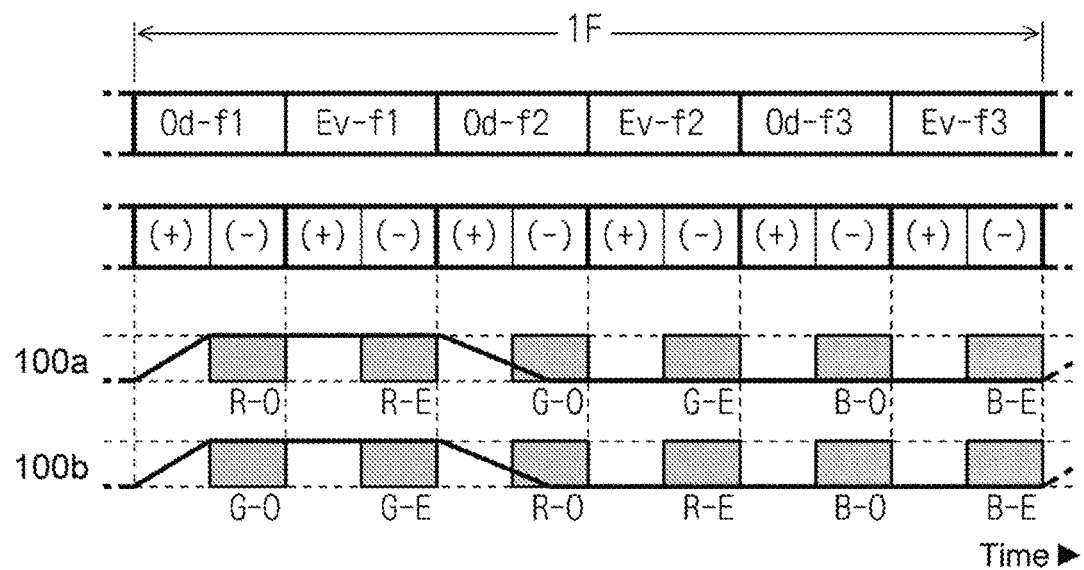
FIG. 12 is a diagram illustrating a reduction in narrowing of a color reproduction range in the projection display device.

In order to avoid such the color mixing, in the present embodiment, representation of the same color component in the video pixel is continuous in the odd-numbered row and the even-numbered row, as illustrated in FIGS. 9 and 12. When the representation of the same color component is continuous in the odd-numbered row and the even-numbered row as in the present embodiment, a shift interval of the light path shift element 190 becomes ⅓ compared to the comparative example.

According to the present embodiment, when the panel pixel a represents the R component of the video pixel in the even-numbered row and the odd-numbered column, the color mixing of the G component occurs due to emission in the unit period (Ev-f1), and when the panel pixel b represents the G component of the video pixel in the even-numbered row and the even-numbered column, the color mixing of the R component occurs.

However, according to the present embodiment, in the panel pixel a, mixing of the G component with the R component in the odd-numbered row and the odd-numbered column, and mixing of the R component with the G component in the odd-numbered row and the even-numbered column are avoided, unlike the comparative example.

Therefore, in the present embodiment, a frequency at which the color mixing occurs is half that of the comparative example, so that an influence on the color reproduction range is reduced and required brightness can be secured.

The projection display device 1 according to the first embodiment can be modified or applied in various ways as follows.

First, an example of the dispositions of the panel pixel a of the liquid crystal panel 100a and the panel pixel b of the liquid crystal panel 100b with respect to the prism 180 is as follows.

Figure 13:
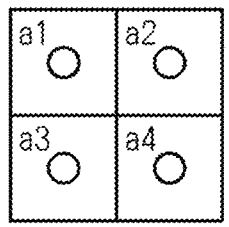
FIG. 13 is a diagram illustrating disposition of panel pixels in a first modification example of the first embodiment.
Figure 13:
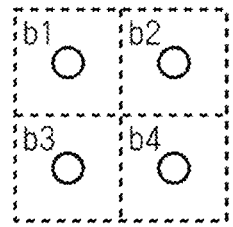
Figure 13:
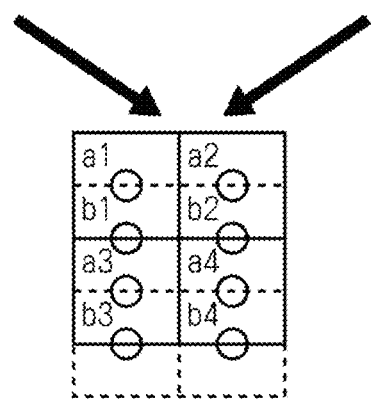

As in a first modification example illustrated in FIG. 13, the arrangement of the panel pixel b may be shifted in the downward direction in the figure by the 0.5 pixels of the panel pixel with respect to the arrangement of the panel pixels a.

In this disposition, in the unit periods (Od-f1, Od-f2, and Od-f3), the panel pixel a represents the video pixel in the odd-numbered row and the odd-numbered column, and the panel pixel b represents the video pixel in the even-numbered row and the odd-numbered column, and in the unit periods (Ev-f1, Ev-f2, and Ev-f3), the panel pixel a represents the video pixel in the odd-numbered rows and the even-numbered column, and the panel pixel b represents the video pixel in the even-numbered row and the even-numbered column. Further, the processing circuit 21 controls the light path shift element 190 so that the light path shift element 190 shifts the projection position in the unit periods (Ev-f1, Ev-f2, and Ev-f3) in the right direction by the 0.5 pixels of the panel pixel from the reference position.

Figure 14:
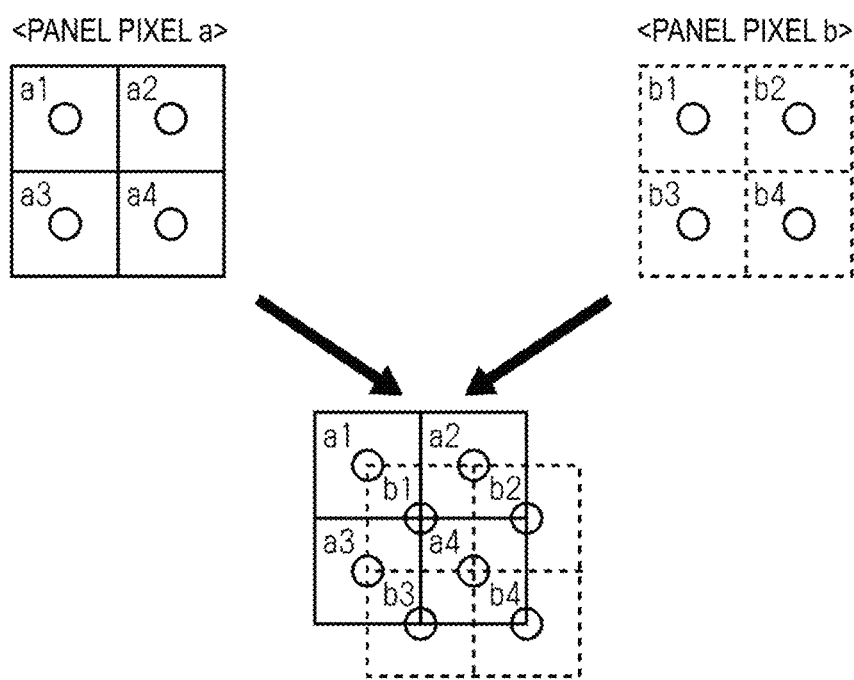
FIG. 14 is a diagram illustrating disposition of panel pixels in a second modification example of the first embodiment.

Further, as in a second modification example illustrated in FIG. 14, the arrangement of the panel pixels b may be shifted in the right direction by the 0.5 pixels of the panel pixel and in the downward direction by 0.5 pixels with respect to the arrangement of the panel pixels a. In this disposition, in the unit periods (Od-f1, Od-f2, and Od-f3), the panel pixel a may represent the video pixel in the odd-numbered row and the odd-numbered column, and the panel pixel b may represent the video pixel in the even-numbered row and the even-numbered column, and in the unit periods (Ev-f1, Ev-f2, and Ev-f3), the panel pixel a may represent the video pixel in the odd-numbered row and the even-numbered column, and the panel pixel b may represent the video pixel in the even-numbered row and the odd-numbered column. Further, the processing circuit 21 may control the light path shift element 190 so that the light path shift element 190 shifts the projection position in the unit periods (Ev-f1, Ev-f2, and Ev-f3) in the right direction, for example, by the 0.5 pixels of the panel pixel from the reference position.

Further, in this disposition, in the unit periods (Od-f1, Od-f2, and Od-f3), the panel pixel a may represent the video pixel in the odd-numbered row and the odd-numbered column, and the panel pixel b may represent the video pixel in the even-numbered row and the even-numbered column, and in the unit periods (Ev-f1, Ev-f2, and Ev-f3), the panel pixel a may represent the video pixel in the even-numbered row and the odd-numbered column, and the panel pixel b may represent the video pixel in the odd-numbered row and the even-numbered column. Further, the processing circuit 21 may control the light path shift element 190 so that the light path shift element 190 shifts the projection position in the unit periods (Ev-f1, Ev-f2, and Ev-f3) in the downward direction, for example, by the 0.5 pixels of the panel pixel from the reference position.

Further, examples of order of a color sequence in the liquid crystal panel 100b and order of light emission colors in the light source 152 are as follows.

Figure 15:
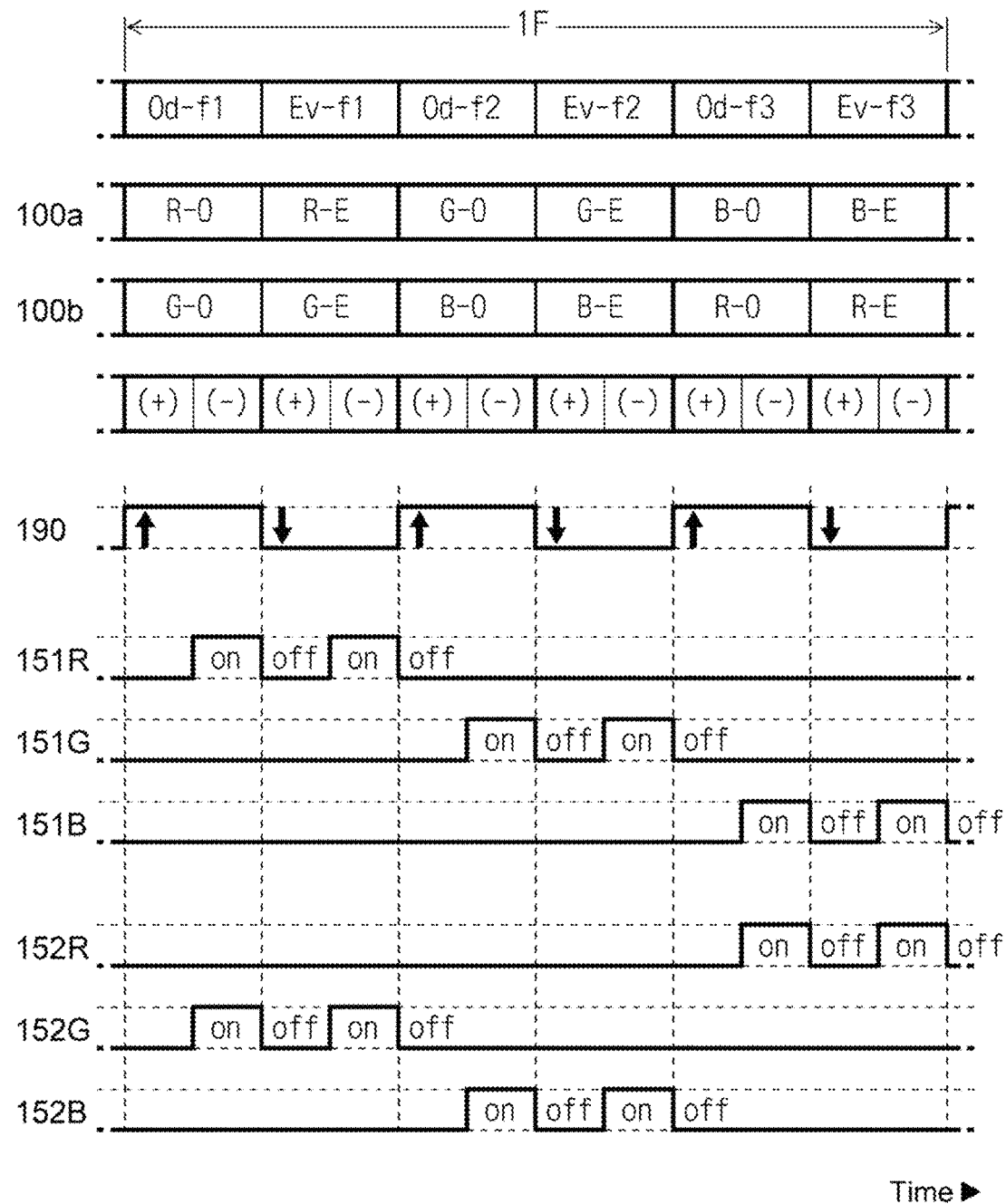
FIG. 15 is a diagram illustrating a color sequence in a third modification example of the first embodiment.

For example, as in a third modification example illustrated in FIG. 15, in the unit periods (Od-f2, Ev-f2, Od-f3, and Ev-f3), the panel pixel b in the liquid crystal panel 100b may represent, in order, the B component (B-O) of the video pixel in the odd-numbered row and the even-numbered column, the B component (B-E) of the video pixel in the even-numbered row and the even-numbered column, the R component (R-O) of the video pixel in the odd-numbered row and the even-numbered column, and the R component (R-E) of the video pixel in the even-numbered row and the even-numbered column. The processing circuit 21 may control the laser light source 152B in the light source 152 so that the laser light source 152B enters the on state in each negative polarity writing period (−) of the unit periods (Od-f2 and Ev-f2), and control the laser light source 152R so that the laser light source 152R enters the on state in each negative polarity writing period (−) of the unit periods (Od-f3 and Ev-f3).

Figure 16:
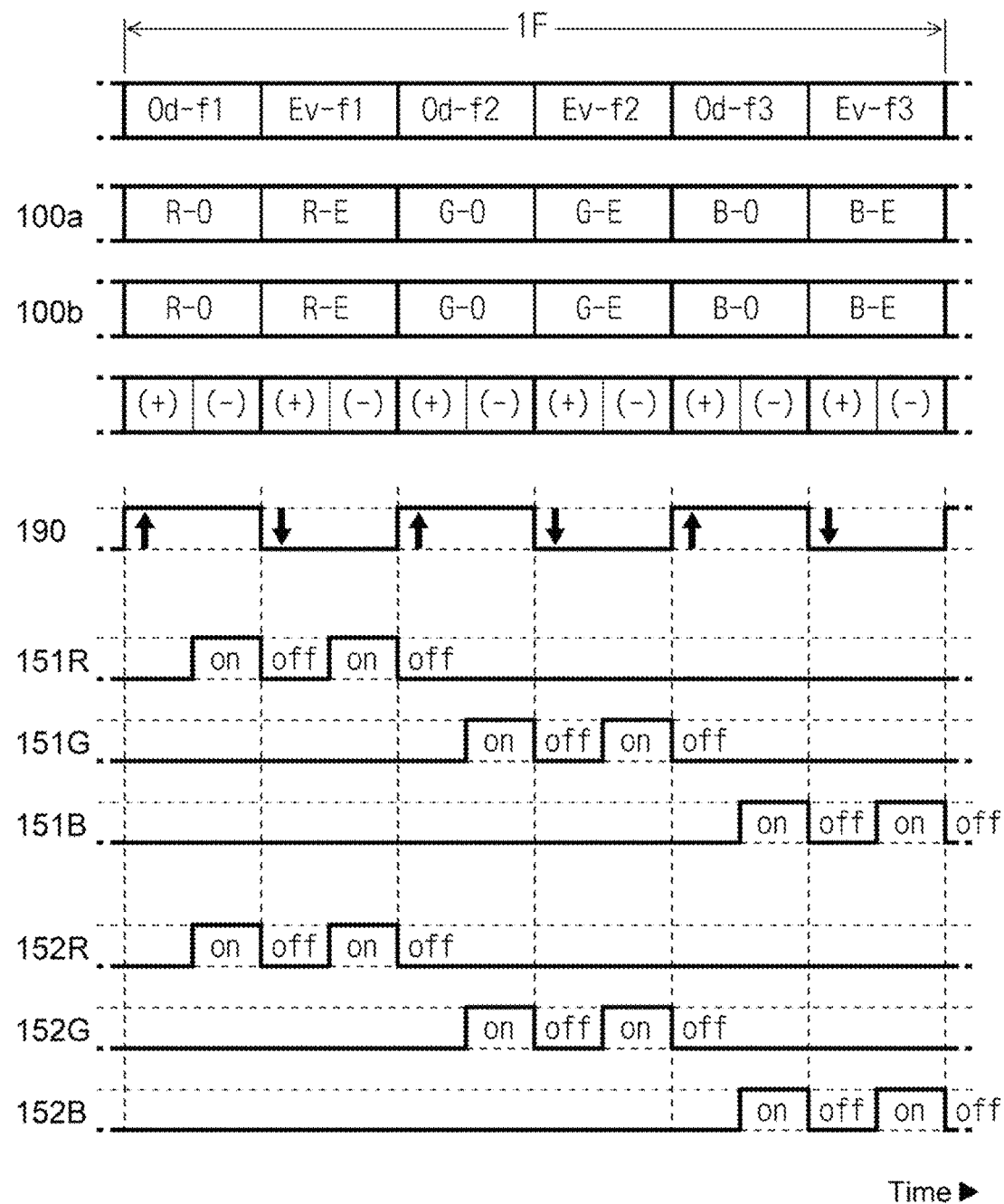
FIG. 16 is a diagram illustrating a color sequence in a fourth modification example of the first embodiment.

Further, for example, as in a fourth modification example illustrated in FIG. 16, the order of the color sequence in the liquid crystal panel 100b may be made the same as the order of the color sequence in the liquid crystal panel 100a, and the order of the light emission colors in the light source 152 may be made the same as the order of the light emission colors in the light source 151.

Here, the order of the color sequence in the liquid crystal panel 100a and the order of the light emission colors in the light source 151 have not been changed from the first embodiment illustrated in FIG. 9, but the orders of the color sequences may be swapped between the liquid crystal panels 100a and 100b, and the order of the light emission colors may be swapped between the light sources 151 and 152.

In the first embodiment, the transmission image from the liquid crystal panel 100a is an example of a first image light, the light source 151 is an example of a first light source, the R component is an example of a first color light component, the G component is an example of a second color light component, the B component is an example of a third color light component, the P-polarized light is an example of first polarized light, and the optical polarization system 160a is an example of a first polarization conversion member. That is, a device including the light source 151, the optical polarization system 160a, and the liquid crystal panel 100a is an example of a first image light emission device.

Further, the transmission image from the liquid crystal panel 100b is an example of second image light, the light source 152 is an example of a second light source, the S-polarized light is an example of second polarized light, and the optical polarization system 160b is an example of a second polarization conversion member. That is, a device including the light source 152, the optical polarization system 160b, and the liquid crystal panel 100b is an example of a second image light emission device.

The prism 180 is an example of an optical combination system.

The unit period (Od-f1) is an example of a first unit period, the unit period (Ev-f1) is an example of a second unit period, the unit period (Od-f2) is an example of a third unit period, the unit period (Ev-f2) is an example of a fourth unit period, the unit period (Od-f3) is an example of a fifth unit period, and the unit period (Ev-f3) is an example of a sixth unit period.

In the first embodiment described above, the color mixing occurs when the video pixel in the even-numbered row is represented, and the color mixing does not occur when the video pixel in the odd-numbered row is represented. In other words, in the first embodiment, a point where the color mixing occurs is fixed, and the color reproduction range of the video pixels in the even-numbered rows is narrower than the color reproduction range of the video pixels in the odd-numbered rows.

Therefore, a projection display device 1 according to a second embodiment that solves this problem will be described. A configuration of the projection display device 1 according to the second embodiment is the same as the configuration of the projection display device 1 according to the first embodiment, and only operations are different from each other. To this end, the operation of the projection display device 1 according to the second embodiment will be mainly described.

Figure 17:
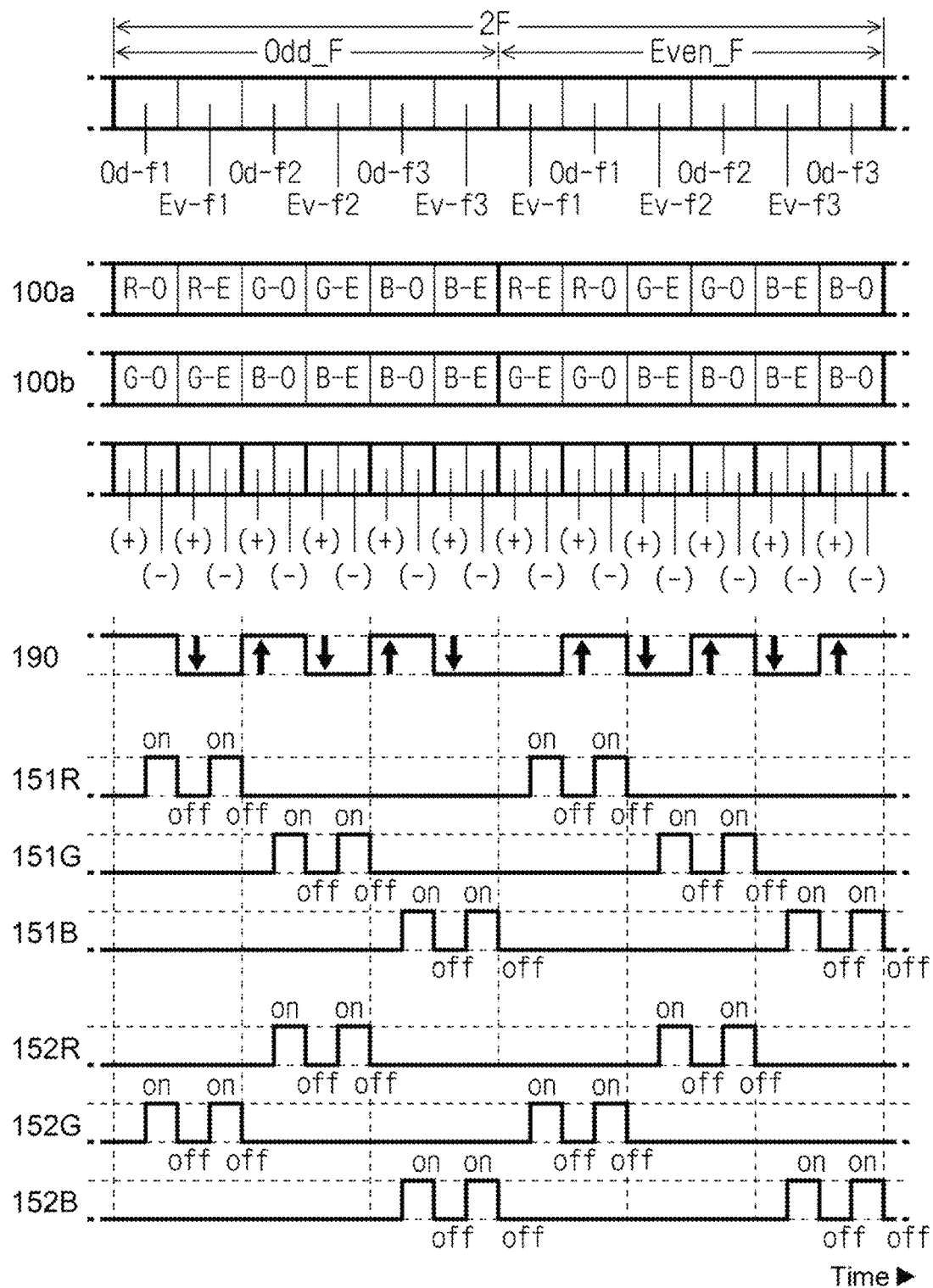
FIG. 17 is a diagram illustrating an operation in a two-frame period of a projection display device according to a second embodiment.

FIG. 17 is a diagram illustrating an operation in a two-frame period of the projection display device 1 according to the second embodiment.

In the second embodiment, the projection display device 1 operates using a two-frame period (2F) including an odd-numbered frame period (Odd_F) earlier in time and an even-numbered frame period (Even_F) later in time as one unit, instead of using the one-frame period (1F) as one unit as in the first embodiment. A time scale of a horizontal axis in FIG. 17 is compressed to ½ of the time scale of the horizontal axis in FIG. 9 due to space constraints on the paper.

The odd-numbered frame period (Odd_F) in the second embodiment is the same as the one-frame period in the first embodiment.

In the even-numbered frame period (Even_F) in the second embodiment, an order of a unit period (Od_f1) and a unit period (Ev_f1) in the odd-numbered frame period (Odd_F) is swapped, a period earlier in time is the unit period (Ev_f1), and a period later in time is the unit period (Od_f1). An order of a unit period (Od_f2) and a unit period (Ev_f2) are also swapped, and an order of a unit period (Od_f3) and a unit period (Ev_f3) are also swapped.

Figure 18:
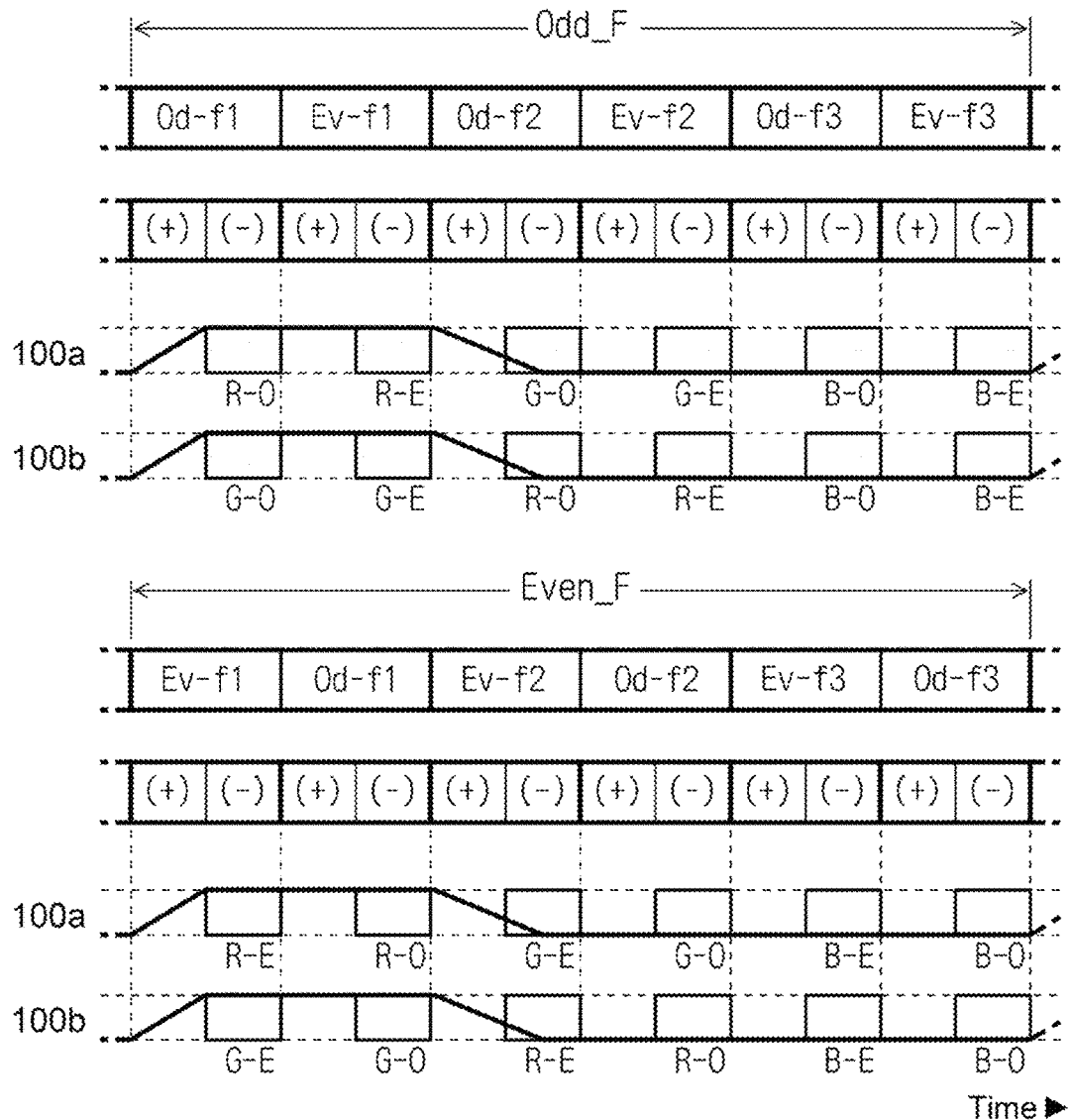
FIG. 18 is a diagram illustrating suppression of bias in narrowing of the color reproduction range in the projection display device.

FIG. 18 is a diagram illustrating an optical response of the panel pixel a of the liquid crystal panel 100a and the panel pixel b of the liquid crystal panel 100b in the odd-numbered frame period (Odd_F) and the even-numbered frame period (Even_F) in the projection display device 1 according to the second embodiment.

The optical response of the panel pixel a and the panel pixel b in the odd-numbered frame period (Odd_F) is the same as that of the first embodiment illustrated in FIG. 12. To this end, in the odd-numbered frame period (Odd_F), the color mixing of the G component occurs when the panel pixel a represents the R component of the video pixel in the even-numbered row and the odd-numbered column, and the color mixing of the R component occurs when the panel pixel b represents the G component of the video pixel in the even-numbered row and the even-numbered column.

On the other hand, the odd-numbered number and the even-numbered number in the unit period are swapped in the even-numbered frame period (Even_F). To this end, when the specific pattern is displayed, the color mixing of the G component occurs due to the light emission in the unit period (Ev-f2) when the panel pixel a represents the R component of the video pixel in the odd-numbered row and the odd-numbered column in the even-numbered frame period (Even_F), and the color mixing of the R component occurs when the panel pixel b represents the G component of the video pixel in the odd-numbered row and the even-numbered column.

Thus, in the second embodiment, the color mixing occurs when the video pixel in the even-numbered row in the odd-numbered frame period (Odd_F) is represented, and the color mixing occurs when the video pixel in the odd-numbered row in the even-numbered frame period (Even_F) is represented.

That is, in the second embodiment, since the occurrence of the color mixing is alternately swapped between the odd-numbered row and the even-numbered row every frame period (1F), the influence of the color mixing is averaged when viewed through the two-frame period (2F).

Therefore, in the second embodiment, the color reproduction range of the video pixels in the odd-numbered rows and the color reproduction range of the video pixels in the even-numbered rows are made substantially the same by averaging, and it is possible to avoid a situation in which the influence of the color mixing is biased to one side as in the first embodiment.

In the second embodiment, an odd-numbered frame period (Odd-F) is an example of a first frame period, and an even-numbered frame period (Even-F) is an example of the two-frame period.

The first and second embodiments described above (hereinafter referred to as "embodiment and the like") can be modified or applied in various ways as follows.

In the embodiment and the like, a period earlier in time in each unit period is a positive polarity writing period (+) and a period later in time is a negative polarity writing period (−), but the periods may be swapped. When the period earlier in time is the writing period (−) and the period later in time is the writing period (+), the processing circuit 21 may control the laser light source so that the laser light source enters the on state in the writing period (+) later in time.

In the embodiment and the like, the liquid crystal panels 100a and 100b as the image light emission devices are of the transmissive type, but the liquid crystal panels 100a and 100b may also be of a reflective type.

Further, the present disclosure can be applied to, for example, a mirror element in which an inclination of a mirror has a position corresponding to on or off and reflects incident light in a predetermined direction only in any one of an on or off state, as the image light emission device.

The following aspects, for example, can be ascertained from the above-described embodiments.

A projection display device according to aspect 1 includes a first image light emission device configured to emit a first color light component and a second color light component in first image light in a time-division manner, a second image light emission device configured to emit a first color light component and a second color light component in second image light in a time-division manner, an optical combination system configured to combine the first image light with the second image light in a state in which the second image light is shifted in a first direction relative to the first image light, and emit a combination light, a light path shift element configured to shift a light path for the combination light emitted from the optical combination system, and a display control circuit configured to control the first image light emission device, the second image light emission device, and the light path shift element, wherein a one-frame period includes first to fourth unit periods, the display control circuit supplies the video pixel aligned in the first direction at odd-numbered positions in a second direction intersecting with the first direction in video pixel data among data signals corresponding to gradation levels designated by the video pixel data arranged in a matrix, the video pixel being a data signal of the first light component, to the first image light emission device, supplies the video pixel aligned in the first direction at an even-numbered position in the second direction in the video pixel data, the video pixel being a data signal of one of the first light component and the second light component, to the second image light emission device, and controls the light path shift element so that the light path is set as a reference position in the first unit period, supplies the video pixel aligned in the first direction at an even-numbered position in the second direction in the video pixel data, the video pixel being a data signal of the first light component, to the first image light emission device, supplies the video pixel aligned in the first direction at an odd-numbered position in the second direction in the video pixel data, the video pixel being a data signal of one of the first light component and the second light component, to the second image light emission device, and controls the light path shift element so that the light path is shifted in the second direction in the second unit period, supplies the video pixel aligned in the first direction at an odd-numbered position in the second direction in the video pixel data, the video pixel being a data signal of the second light component, to the first image light emission device, supplies the video pixel aligned in the first direction at an even-numbered position in the second direction in the video pixel data, the video pixel being a data signal of the other of the first light component and the second light component, to the second image light emission device, and controls the light path shift element so that the light path returns to the reference position in the third unit period, and supplies the video pixel aligned in the first direction at an even-numbered position in the second direction in the video pixel data, the video pixel being a data signal of the second light component, to the first image light emission device, supplies the video pixel aligned in the first direction at an odd-numbered position in the second direction in the video pixel data, the video pixel being a data signal of the other of the first light component and the second light component, to the second image light emission device, and controls the light path shift element so that the light path is shifted in the second direction in the fourth unit period, and the first image light emission device emits the first image light based on the supplied data signal, and the second image light emission device emits the second image light based on the supplied data signal.

According to the projection display device according to aspect 1, it is possible to provide high-resolution projection at low cost and to curb narrowing of the color reproduction range.

In the projection display device according to specific aspect 2 of aspect 1, in the optical combination system, an amount of shift of the second image light in the first direction relative to the first image light is 0.5 pixels of the pixel in the first image light or the second image light, and an amount of shift of the light path in the light path shift element is the 0.5 pixels.

In the projection display device according to specific aspect 3 of aspect 2, the first image light emission device includes a first liquid crystal panel, a first light source configured to emit light toward the first liquid crystal panel, and a first polarization conversion member configured to convert the light emitted by the first light source into first polarized light, the first polarized light is incident on the first liquid crystal panel, the second image light emission device includes a second liquid crystal panel, a second light source configured to emit light toward the second liquid crystal panel, and a second polarization conversion member configured to convert the light emitted by the second light source into second polarized light, and the second polarized light is incident on the second liquid crystal panel.

In the projection display device according to specific aspect 4 of aspect 3, the first light source and the second light source are laser light sources that respectively emit first light including a wavelength range of the first light component and second light including a wavelength range of the second light component.

In the projection display device according to another specific aspect 5 of aspect 3, the first liquid crystal panel emits a first color light component of the first image light in positive polarity writing and negative polarity writing, and the second liquid crystal panel emits one of a first color light component and a second color component of the second image light in positive polarity writing and negative polarity writing in the first unit period, the first liquid crystal panel emits a second color light component of the first image light in positive polarity writing and negative polarity writing, and the second liquid crystal panel emits one of a first color light component or a second color component of the second image light in the positive polarity writing and the negative polarity writing in the second unit period, the first liquid crystal panel emits the second color light component of the first image light in the positive polarity writing and the negative polarity writing, and the second liquid crystal panel emits the other of the first color light component and the second color component of the second image light in the positive polarity writing and the negative polarity writing in the third unit period, and the first liquid crystal panel emits the second color light component of the first image light in the positive polarity writing and the negative polarity writing, and the second liquid crystal panel emits the other of the first color light component and the second color component of the second image light in the positive polarity writing and the negative polarity writing in the fourth unit period.

In a projection display device according to a specific aspect 6 of aspect 5, when one of positive polarity writing or negative polarity writing comes first in chronological order in the first to fourth unit periods, the display control circuit controls the first light source and the second light source so that the first light source and the second light source enter the off state in one of the positive polarity writing period and negative polarity writing period, and controls the first light source and the second light source so that the first light source and the second light source enter the on state in the other of the positive polarity writing period and the negative polarity writing period.

In the projection display device according to another specific aspect 7 of aspect 1, the one-frame period is a first frame period, the first frame period is followed by a second frame period, and the second frame period is a second period, a first period, a fourth period, and a third period in chronological order.

In the projection display device according to another specific aspect 8 of aspect 1, the first image light emission device further emits a third light component in the first image light in a time-division manner, the second image light emission device further emits a third light component in the second image light in a time-division manner, the one-frame period further includes a fifth unit period and a sixth unit period, the display control circuit supplies the video pixel aligned in the first direction at an odd-numbered position in the second direction in the video pixel data, the video pixel being a data signal of the third light component, to the first image light emission device, supplies the video pixel aligned in the first direction at an even-numbered position in the second direction in the video pixel data, the video pixel being a data signal of the third light component, to the second image light emission device, and controls the light path shift element so that the light path returns to the reference position in the fifth unit period, and supplies the video pixel aligned in the first direction at an even-numbered position in the second direction in the video pixel data, the video pixel being a data signal of the third light component, to the first image light emission device, supplies the video pixel aligned in the first direction at an odd-numbered position in the second direction in the video pixel data, the video pixel being a data signal of the third light component, to the second image light emission device, and controls the light path shift element so that the light path is shifted in the second direction in the sixth unit period.

What is claimed is:

1. A projection display device comprising: a first image light emission device configured to emit a first color light component and a second color light component in first image light in a time-division manner, a second image light emission device configured to emit a first color light component and a second color light component in second image light in a time-division manner; an optical combination system configured to combine the first image light with the second image light in a state in which the second image light is shifted in a first direction relative to the first image light, and emit a combination light; a light path shift element configured to shift a light path for the combination light emitted from the optical combination system; and a display control circuit configured to control the first image light emission device, the second image light emission device, and the light path shift element, wherein a one-frame period includes first to fourth unit periods, the display control circuit supplies a video pixel aligned in the first direction at an odd-numbered position in a second direction intersecting the first direction in video pixel data among data signals corresponding to gradation levels designated by the video pixel data arranged in a matrix, the video pixel being a data signal of the first light component, to the first image light emission device, supplies the video pixel aligned in the first direction at an even-numbered position in the second direction in the video pixel data, the video pixel being a data signal of one of the first light component and the second light component, to the second image light emission device, and controls the light path shift element so that the light path is set as a reference position in the first unit period, supplies the video pixel aligned in the first direction at an even-numbered position in the second direction in the video pixel data, the video pixel being a data signal of the first light component to the first image light emission device, supplies the video pixel aligned in the first direction at an odd-numbered position in the second direction in the video pixel data, the video pixel being a data signal of one of the first light component and the second light component, to the second image light emission device, and controls the light path shift element so that the light path is shifted in the second direction in the second unit period, supplies the video pixel aligned in the first direction at an odd-numbered position in the second direction in the video pixel data, the video pixel being a data signal of the second light component, to the first image light emission device, supplies the video pixel aligned in the first direction at an even-numbered position in the second direction in the video pixel data, the video pixel being a data signal of the other of the first light component and the second light component, to the second image light emission device, and controls the light path shift element so that the light path returns to the reference position in the third unit period, and supplies the video pixel aligned in the first direction at an even-numbered position in the second direction in the video pixel data, the video pixel being a data signal of the second light component, to the first image light emission device, supplies the video pixel aligned in the first direction at an odd-numbered position in the second direction in the video pixel data, the video pixel being a data signal of the other of the first light component and the second light component, to the second image light emission device, and controls the light path shift element so that the light path is shifted in the second direction in the fourth unit period, and the first image light emission device emits the first image light based on the supplied data signal, and the second image light emission device emits the second image light based on the supplied data signal, wherein the first image light emission device further emits a third light component in the first image light in a time-division manner, the second image light emission device further emits a third light component in the second image light in a time-division manner, the one-frame period further includes a fifth unit period and a sixth unit period, the display control circuit, supplies the video pixel aligned in the first direction at an odd-numbered position in the second direction in the video pixel data, the video pixel being a data signal of the third light component, to the first image light emission device, supplies the video pixel aligned in the first direction at an even-numbered position in the second direction in the video pixel data, the video pixel being a data signal of the third light component, to the second image light emission device, and controls the light path shift element so that the light path returns to the reference position in the fifth unit period, and supplies the video pixel aligned in the first direction at an even-numbered position in the second direction in the video pixel data, the video pixel being a data signal of the third light component, to the first image light emission device, supplies the video pixel aligned in the first direction at an odd-numbered position in the second direction in the video pixel data, the video pixel being a data signal of the third light component, to the second image light emission device, and controls the light path shift element so that the light path is shifted in the second direction in the sixth unit period.

2. The projection display device according to claim 1, wherein in the optical combination system, an amount of shift of the second image light in the first direction relative to the first image light is 0.5 pixels of the pixel in the first image light or the second image light, and an amount of shift of the light path in the light path shift element is 0.5 pixels.

3. The projection display device according to claim 2, wherein the first image light emission device includes a first liquid crystal panel, a first light source configured to emit light toward the first liquid crystal panel, and a first polarization conversion member configured to convert the light emitted by the first light source into first polarized light, the first polarized light is incident on the first liquid crystal panel, the second image light emission device includes a second liquid crystal panel, a second light source configured to emit light toward the second liquid crystal panel, and a second polarization conversion member configured to convert the light emitted by the second light source into second polarized light, and the second polarized light is incident on the second liquid crystal panel.

4. The projection display device according to claim 3, wherein each of the first light source and the second light source is a laser light source configured to emit first light including a wavelength range of the first light component and second light including a wavelength range of the second light component.

5. The projection display device according to claim 3, wherein in the first unit period, the first liquid crystal panel emits a first color light component of the first image light in positive polarity writing and negative polarity writing, and the second liquid crystal panel emits one of a first color light component and a second color component of the second image light in positive polarity writing and negative polarity writing, in the second unit period, the first liquid crystal panel emits a second color light component of the first image light in positive polarity writing and negative polarity writing, and the second liquid crystal panel emits one of a first color light component or a second color component of the second image light in the positive polarity writing and the negative polarity writing, in the third unit period, the first liquid crystal panel emits the second color light component of the first image light in the positive polarity writing and the negative polarity writing, and the second liquid crystal panel emits the other of the first color light component and the second color component of the second image light in the positive polarity writing and the negative polarity writing, and in the fourth unit period, the first liquid crystal panel emits the second color light component of the first image light in the positive polarity writing and the negative polarity writing, and the second liquid crystal panel emits the other of the first color light component and the second color component of the second image light in the positive polarity writing and the negative polarity writing.

6. The projection display device according to claim 5, wherein in the first to fourth unit periods, when one of positive polarity writing and negative polarity writing comes first in chronological order, the display control circuit controls the first light source and the second light source so that the first light source and the second light source enter an off state in one of the positive polarity writing period and the negative polarity writing period, and controls the first light source and the second light source so that the first light source and the second light source enter the on state in the other of the positive polarity writing period and the negative polarity writing period.

7. The projection display device according to claim 1, wherein the one-frame period is a first frame period, the first frame period is followed by a second frame period, and the second frame period includes a second period, a first period, a fourth period, and a third period in chronological order.

* * * * *